United States Patent
Kompella

(10) Patent No.: US 7,948,996 B2
(45) Date of Patent: *May 24, 2011

(54) COMMUNICATING CONSTRAINT INFORMATION FOR DETERMINING A PATH SUBJECT TO SUCH CONSTRAINTS

(75) Inventor: Kireeti Kompella, Los Altos, CA (US)

(73) Assignee: Juniper Networks, Sunnyvale, CA (US)

(*) Notice: Subject to any disclaimer, the term of this patent is extended or adjusted under 35 U.S.C. 154(b) by 319 days.

This patent is subject to a terminal disclaimer.

(21) Appl. No.: 11/950,219

(22) Filed: Dec. 4, 2007

(65) Prior Publication Data

US 2008/0084890 A1   Apr. 10, 2008

Related U.S. Application Data

(63) Continuation of application No. 09/752,501, filed on Dec. 29, 2000, now Pat. No. 7,319,700.

(51) Int. Cl.
*H04L 12/28* (2006.01)
*H04L 12/56* (2006.01)

(52) U.S. Cl. ...................................................... 370/400

(58) Field of Classification Search .................. 370/230, 370/227, 252, 351, 431, 395, 400, 401, 237, 370/244, 389, 410, 238, 419, 256; 709/238, 709/223, 226, 241, 245, 230; 712/226, 23, 712/200, 218, 214, 217, 213, 221; 718/106, 718/105, 107, 100; 717/140, 106, 226, 138, 717/153, 158, 159; 318/571
See application file for complete search history.

(56) References Cited

U.S. PATENT DOCUMENTS

| | | | | |
|---|---|---|---|---|
| 4,454,593 A | * | 6/1984 | Fleming et al. | 345/428 |
| 4,791,550 A | * | 12/1988 | Stevenson et al. | 718/106 |
| 5,287,511 A | * | 2/1994 | Robinson et al. | 717/106 |
| 5,459,864 A | * | 10/1995 | Brent et al. | 718/105 |
| 5,524,244 A | * | 6/1996 | Robinson et al. | 717/140 |
| 5,600,638 A | * | 2/1997 | Bertin et al. | 370/351 |
| 5,878,266 A | * | 3/1999 | Goddard et al. | 712/23 |
| 6,000,028 A | * | 12/1999 | Chernoff et al. | 712/226 |
| 6,122,721 A | * | 9/2000 | Goddard et al. | 712/23 |
| 6,421,718 B1 | * | 7/2002 | Lamkin et al. | 709/223 |
| 6,449,647 B1 | * | 9/2002 | Colby et al. | 709/226 |
| 6,529,498 B1 | * | 3/2003 | Cheng | 370/351 |
| 6,538,416 B1 | * | 3/2003 | Hahne et al. | 370/431 |
| 6,600,724 B1 | * | 7/2003 | Cheng | 370/256 |
| 6,665,273 B1 | * | 12/2003 | Goguen et al. | 370/252 |
| 6,721,269 B2 | * | 4/2004 | Cao et al. | 370/227 |

(Continued)

*Primary Examiner* — Pankaj Kumar
*Assistant Examiner* — Prenell P Jones
(74) *Attorney, Agent, or Firm* — John C. Pokotylo; Straub & Pokotylo

(57) ABSTRACT

Path determination constraints may be encoded in the form of a program having one or more instructions. Each of instructions may include an operation code, and operands (or pointers to locations where operands are stored). In this way, an extensible, interoperable way for a nodes (e.g., label-switching routers) to communicate constraints within a network is provided. Such constraints may be inserted (e.g., as one or more CONSTRAINT objects) into signaling messages (e.g., a PATH RSVP message). By enabling the signaling of constraints, the determination of constraint-based (label-switched) paths can be distributed among a number of (label-switching) routers or other nodes. Upon receiving a message with constraints (e.g., a CONSTRAINT object(s)), a node may (i) ignore the constraints if the node is a tail-end node (label-switching router), (ii) apply the constraints to a link if the next hop in the (label-switched) path is strict, and/or (iii) perform a constraint-based path determination to a next hop if the next hop is loose.

14 Claims, 16 Drawing Sheets

U.S. PATENT DOCUMENTS

| | | |
|---|---|---|
| 6,728,777 B1 * | 4/2004 | Lee et al. ....................... 709/238 |
| 6,765,921 B1 * | 7/2004 | Stacey et al. .................. 370/401 |
| 6,778,496 B1 * | 8/2004 | Meempat et al. .............. 370/230 |
| 6,850,524 B1 * | 2/2005 | Troxel et al. ............. 370/395.32 |
| 6,956,821 B2 * | 10/2005 | Szviatovszki et al. ........ 370/237 |
| RE39,907 E * | 11/2007 | Hong ............................. 318/571 |
| 2002/0032718 A1 * | 3/2002 | Yates et al. .................... 709/107 |
| 2002/0141345 A1 * | 10/2002 | Szviatovszki et al. ........ 370/238 |
| 2009/0113187 A1 * | 4/2009 | Hansen et al. ................ 712/225 |

* cited by examiner

| LINK SOURCE | LINK DESTINATION | LINK COST |
|---|---|---|
| | | |

| LINK SOURCE | LINK DEST. | LINK COST | LINK ATTRIBUTE 1 | ... | LINK ATTRIBUTE q | SOURCE NODE ATTRIBUTE 1 | ... | SOURCE NODE ATTRIBUTE r | DEST. NODE ATTRIBUTE 1 | ... | DEST. NODE ATTRIBUTE s |
|---|---|---|---|---|---|---|---|---|---|---|---|
| | | | | | | | | | | | |

810 — 820 — 830 — 840a — 840b — 850a — 850b — 860a — 860b

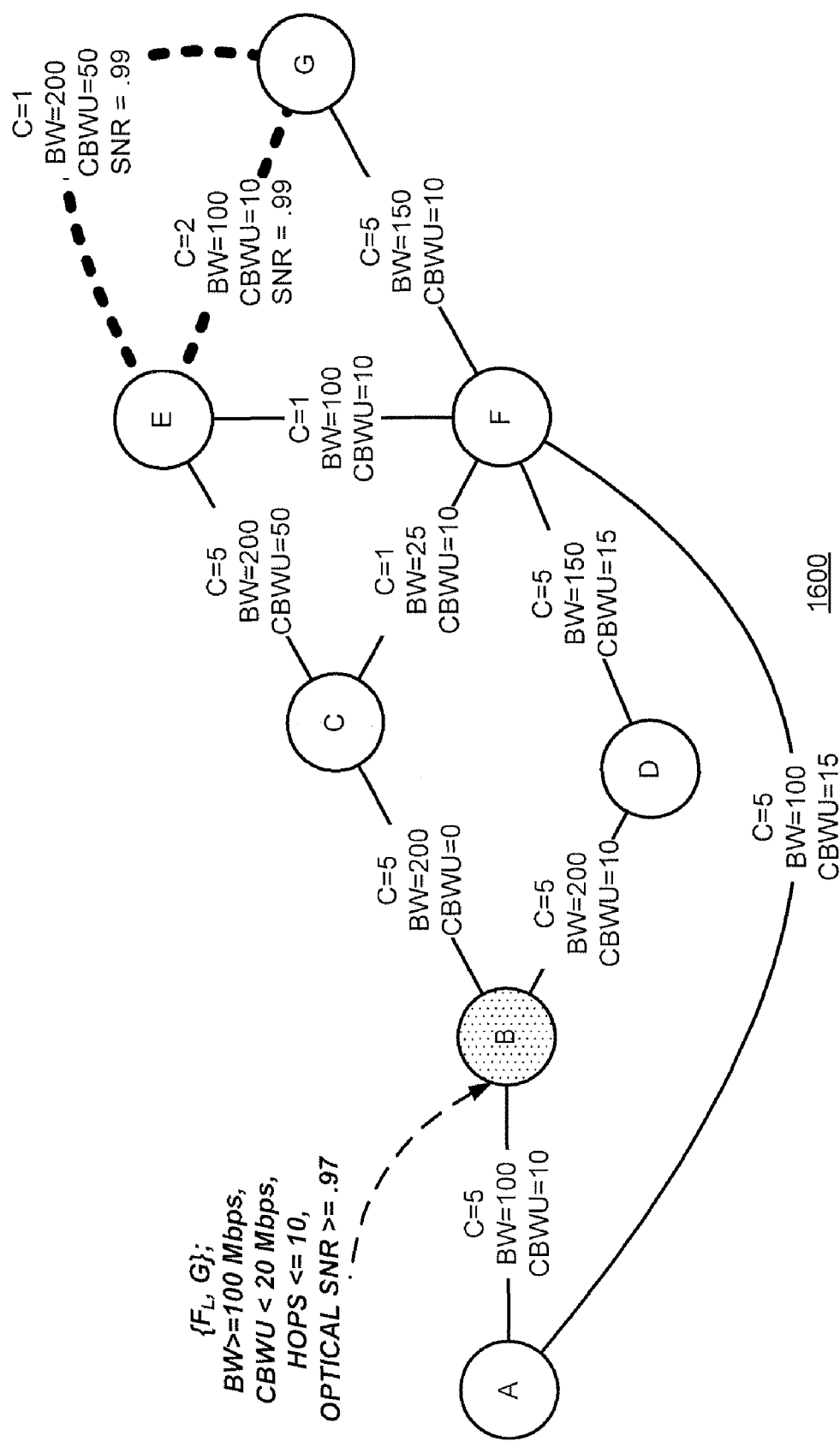

COMMUNICATING CONSTRAINT INFORMATION FOR DETERMINING A PATH SUBJECT TO SUCH CONSTRAINTS

§0. RELATED APPLICATIONS

This application is a continuation of U.S. patent application Ser. No. 09/752,501 (incorporated herein by reference and referred to as "the '501 application"), titled "COMMUNICATING CONSTRAINT INFORMATION FOR DETERMINING A PATH SUBJECT TO SUCH CONSTRAINTS," filed on Dec. 29, 2000 now U.S. Pat. No. 7,319, 700 and listing Kireeti KOMPELLA as the inventor.

§1. BACKGROUND OF THE INVENTION

§1.1 Field of the Invention

The present invention concerns establishing a path, such as a label-switched path, through a network, where the path is subject to constraints. In particular, the present invention concerns the communication of constraint information in instances where a given node of the network cannot, or does not wish to, determine the entire path.

§1.2 Description of Related Art

The description of art in this section is not, and should not be interpreted to be, an admission that such art is prior art to the present invention.

Many large networks are made up of interconnected nodes (referred to as "routers" below without loss of generality). The routers may be geographically distributed throughout a region and connected by links (e.g., optical fiber, copper cable, wireless transmission channels, etc.). In such a network, each router typically interfaces with (e.g., terminates) multiple input links and multiple output links. Addressed data (referred to as "packets" below without loss of generality) traverse the network by being forwarded from router to router until they reach their destinations (as typically specified in by so-called layer-3 addresses in the packet headers). Unlike switches, which establish a connection for the duration of a "call" or "session" to send data received on a given input port out on a given output port, routers determine the destination addresses of received packets and, based on these destination addresses, determine, in each case, the appropriate output link on which to send them. Since, unlike switches, routers are not connection-based, packets having the same destination address may actually traverse different paths through the network.

In some cases, however, it may be deemed desirable to establish a fixed path through at least a part of the network for a group of packets, commonly referred to as a "flow". More specifically, merely using known routing protocols (e.g., shortest path algorithms) to determine paths is becoming unacceptable in light of the ever-increasing volume of Internet traffic and the mission-critical nature of some Internet applications. Such known routing protocols can actually contribute to network congestion if they to not account for bandwidth availability and traffic characteristics when constructing routing (and forwarding) tables.

Traffic engineering permits network administrators to map traffic flows onto an existing physical topology. In this way, network administrators can move traffic flows away from congested shortest paths to a less congested path. One traffic engineering technique, in which a fixed path is established, is known as label switching. The fixed path will be from a front-end node (e.g., an ingress router) to a tail-end node (e.g., an egress router). The fixed path may be determined by the front-end node. Once a path is determined, each router in the path may be configured to forward packets to the next ("downstream") router in the path. Routers in the path determine that a given set of packets (e.g., a flow) are to be sent over the fixed path (as opposed to being routed individually) based on unique labels added to the packets.

When the fixed path through the network is being determined, information about the nodes and links in the network may be considered. For example, the fixed path, or parts thereof, may be subject to constraints, and/or certain characteristics of the path may be minimized, or maximized. In some cases, however, the front-end node (or an intermediate node) will not have access to sufficient information to determine a path to the tail-end node, or a path to the tail-end node that satisfies the constraints. In such cases, the front-end node cannot, by itself, establish the fixed path to the tail-end node. Even if the front-end node has access to such information, it may nonetheless be desired to delegate some or all of the responsibility for computing the fixed path. In either case, if path determination is to be delegated to another facility (e.g., a downstream node), constraints, if any, should be communicated to that facility.

§2. SUMMARY OF THE INVENTION

The present invention provides a method for processing, by a node of a network, a message carrying at least one network path determination constraint. The method may perform a constraint-based path determination to (a) an area border node, (b) an autonomous system gateway node, (c) a node that can process one of the network path determination constraint(s) carried by the message which the present node cannot, or will not, evaluate, (d) a specified loose-hop node, or (e) a node to which constraint processing is delegated, to generate a partial path. The method may then forward the message carrying the network path determination constraint(s) to an adjacent downstream node on the partial path, or to a delegated node that can carry out the path determination.

The present invention also provides a method for processing, by a node of a network, a message carrying at least one network path determination constraint, by performing a constraint-based path determination to a next node to generate a partial path, and forwarding the message carrying the network path determination constraint(s) to an adjacent downstream node on the partial path.

The present invention also provides a method for processing, by a node of a network, a message carrying at least one network path determination constraint. The method may determine whether the node is a tail-end node, a head-end node, or an intermediate node of the path. If it is determined that the node is a tail-end node and each of the network path determination constraint(s) has been satisfied, then the method may signal back to an upstream node of the path that the path is OK. If it is determined that the node is a head-end node, or an intermediate node, then the method may determine whether (a) a strict-hop node is specified as a next node of an explicit path constraint, (b) a loose-hop node is specified as a next node of an explicit path constraint, or (c) no node is specified as an explicit path constraint. If a strict-hop node is specified as a next node of an explicit path constraint, then the method may apply each of the network path determination constraint(s) to an appropriate one of a link between the node and the strict-hop node, the strict-hop node, and the partial path defined. If each of the constraint(s) is satisfied, the method may then forward a message carrying the network path determination constraint(s) to the strict-hop node. If any one of the constraint(s) was not satisfied, the method may then signal a path error back to an upstream node. If (a) a loose hop node is specified as a next node of an explicit path constraint, or (b) no node is specified as an explicit path constraint, the method may then perform a constraint-based path determination to (a) an area border node, (b) an autonomous system gateway node, (c) a node that can process one of the network path determination constraint(s) carried by the message which the present node cannot, or is unwilling to, evaluate, (d) a specified loose-hop node, or (e) a node to which constraint processing is delegated, to generate a partial path. The method may then forward the message carrying the network path determination constraint(s) to an adjacent downstream node on the partial path.

The present invention also provides a method for processing, by a node of a network, a message carrying network path determination constraint(s). If the tail-end node of the path is in a part of the network, the topology of which is not known by the node, the method may then perform a constraint-based path determination to an area border node, or an autonomous system gateway node, to generate a partial path. The method may then forward the message carrying the network path determination constraint(s) to an adjacent downstream node on the partial path. If a next node specified in a list of explicit nodes is a loose-hop node, the method may then perform a constraint-based path determination to the next loose-hop node to generate a partial path. The method may then forward the message carrying the network path determination constraint(s) to an adjacent downstream node on the partial path. If the node cannot, or will not, process any one of the network path determination constraint(s), then the method may perform a constraint-based path determination to a node that can process that network path determination constraint(s), to generate a partial path. The method may then forward the message carrying the network path determination constraint(s) to an adjacent downstream node on the partial path. If constraint processing has been delegated to another network element, the method may, though need not, perform a constraint-based path determination to the other network element to which constraint processing has been delegated to generate a partial path. The method may then forward the message carrying the network path determination constraint(s) to an adjacent downstream node on the partial path.

In any of the foregoing methods, the network path determination constraint(s) may include a list of one or more explicit nodes specified to be a part of the path. This list may identify a node as a strict-hop node, or a loose-hop node. Further, the path may be a label-switched path. The message may be a resource reservation protocol PATH message.

In any of the foregoing methods, each of the network path determination constraint(s) may be an executable instruction. Each executable instruction may include information about a first operand, information about a second operand, and an operation code. The operation code may denote a bit-wise AND, a bit-wise OR, bit-wise XOR, bit-wise equality, bit-wise inversion, Boolean AND, Boolean OR, and Boolean negation. The information about either of the first operand or the second operand may be a pointer to a register. The register may contain a link attribute, and may be a read-only register.

The present invention may also provide nodes (e.g., routers), or parts thereof, for performing any of the foregoing methods, data structures for storing intermediate or final results of any of the foregoing methods, and messages used in any of the foregoing methods.

§3. BRIEF DESCRIPTION OF THE DRAWINGS

FIG. 7 is an exemplary table which illustrates values that may be stored in a link state database.

FIG. 8 is an exemplary table which illustrates values that may be stored in a traffic engineering database (TED).

FIGS. 16A through 16E illustrate an exemplary network in which an operation of an exemplary embodiment of the present invention is illustrated.

§4. DETAILED DESCRIPTION

The present invention involves novel methods, apparatus and data structures for communicating (e.g., signaling) constraints to be considered when determining a constraint-based path through a network. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

In the following, an exemplary environment in which the present invention may operate is described in §4.1. Then, functions that may be performed by the present invention are introduced in §4.2. Then, exemplary operations, apparatus, methods and data structures that may be used to effect those functions are described in §4.3. Examples of operations of an exemplary embodiment of the invention are then provided in §4.4. Finally, some conclusions regarding the present invention are set forth in §4.5.

§4.1 Environment in which the Present Invention May Operate

The present invention may be used to help construct a fixed path in networks, such as networks employing the TCP/IP protocol for example. To reiterate, the present invention may be used to carry constraints when the construction of at least a part of the fixed path is to be delegated.

§4.1.1 Exemplary Network Environment

Figure 1:
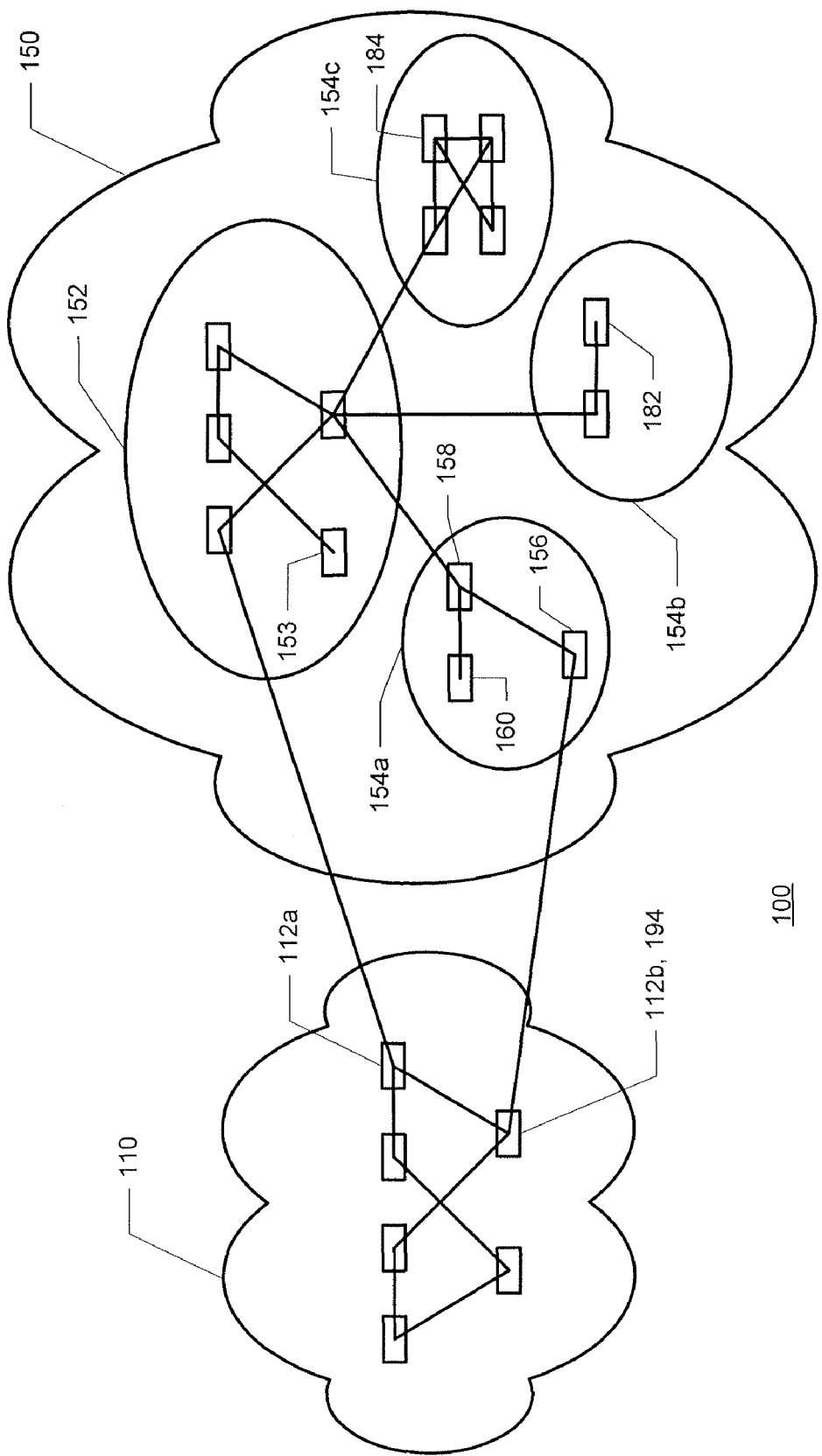
FIG. 1 is a high-level diagram that illustrates an internet in which the present invention may be used.

FIG. 1 illustrates an internet in which the present invention may be used. As illustrated in FIG. 1, an internet 100 may be viewed as a number of sub-networks or "autonomous systems" (also referred to as "AS") 110, 150. Different entities may own and/or operate different autonomous systems. A routing algorithm for use within an autonomous system is called an "interior gateway protocol" (or "IGP"), while a routing algorithm for use between autonomous systems is called an "exterior gateway protocol". Known interior gateway protocols have been classified as distance vector routing protocols (e.g., the "routing information protocol" (or "RIP")), and link state protocols (e.g., the "open shortest path first" (or "OSPF") protocol and the "intermediate system-to-intermediate system" (or "IS-IS") protocol). Generally, link state routing protocols are preferred over distance vector routing protocols. Known exterior gateway protocols include the "border gateway protocol" (or "BGP").

Some autonomous systems (ASes) may become quite large, and their management may become quite complex. In such instances, hierarchical routing techniques may be used to define the large autonomous system as a number of smaller regions. Typically, routers within a given region only know the detailed topology of the network within their region, know how to get to other regions, and know the addresses of nodes contained in the other regions (or just those nodes contained in a backbone area). Thus, hierarchical routing techniques serve to reduce the complexity of routers by shielding the complexity of the network beyond a router's region. The cost, however, of this reduced complexity is that globally shortest paths are not necessarily determined.

Referring to the autonomous system 150 of FIG. 1, the OSPF interior gateway protocol may divide the autonomous system 150 into a number of areas 154, each of which is connected with a backbone area 152. Routers can be classified as follows. "Internal routers" are wholly within one area (See, e.g., routers 153, 160), "area border routers" connect two or more areas (See, e.g., router 158), "backbone routers" are in the backbone (See, e.g., router 153), and "AS boundary routers" neighbor routers in other autonomous systems (See, e.g., routers 112 and 156). Notice that a given router may belong to more than one class.

In the network 100 of FIG. 1, a head-end router may want to determine a fixed path, subject to constraints, to a tail-end router. To reiterate, in some instances, the head-end router will lack access to sufficient information to determine the path (e.g., the tail-end router may be in a different area and/or a different autonomous system, and/or the head-end router may lack knowledge about characteristics of links and/or nodes that are subject to constraints), in its entirety, or may simply want to delegate (e.g., to a downstream router or a path computation server) the responsibility for generating the path. For example, the head-end router (or another router in the fixed path) may signal a request to a downstream router to complete the determination of the fixed path. Alternatively, the head end router may request a path computation router or server to compute the entire path. This request should carry (or be in some way associated with) the constraints. The downstream router may then complete the path. Note, however, that if the downstream router cannot complete the path in its entirety, or wants to delegate this responsibility, it may similarly signal a further request to a downstream router, and so on.

Various aspects of the present invention may take place in one or more label-switching routers (e.g., MPLS routers). Referring back to FIG. 1, the head-end and tail-end label-switching routers may reside (a) in the different autonomous systems, (b) in different areas of a single autonomous system, or (c) within the same area (or within a single autonomous system without areas).

§4.1.2 Exemplary Network Node

Figure 2:
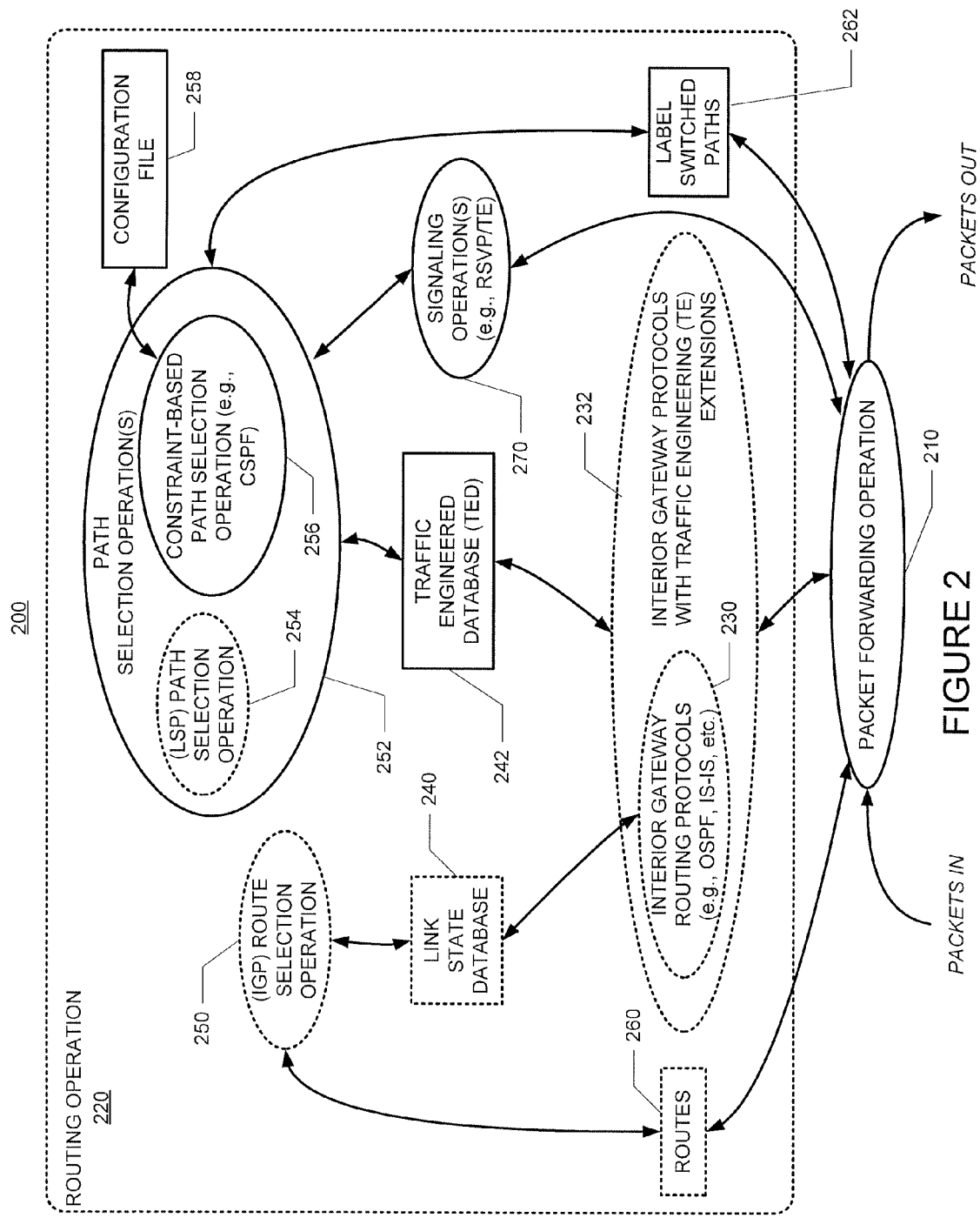
FIG. 2 is a process bubble diagram of an exemplary node that may be used in the internet of FIG. 1, and in which the present invention may operate.

FIG. 2 is a process bubble diagram of a router 200 allowing traffic engineering by supporting the generation of fixed paths (e.g., via label-switched paths, such as those defined in accordance with MPLS). The router 200 may include a packet forwarding operation 210 and a routing operation 220. The routing operation 220 may include an operation 230 for effecting an interior gateway protocol(s). Such an interior gateway protocol(s) may be a link state routing protocol, such as OSPF or IS-IS for example. An operation 232 for extending these protocols to gather information for traffic engineering (e.g., link attributes, node attributes, etc.) may also be provided.

The link state interior gateway protocol 230 may be used to generate a link state database 240 in a known manner. FIG. 7 is an exemplary table 240' that illustrates information that may be included in a link state database 240. As shown in FIG. 7, the exemplary table 240' may include a column 710 with link source values (e.g., layer 3 node addresses), a column 720 with link destination values (e.g., layer 3 node addresses), and a column 730 with link "cost" values.

Figure 9:
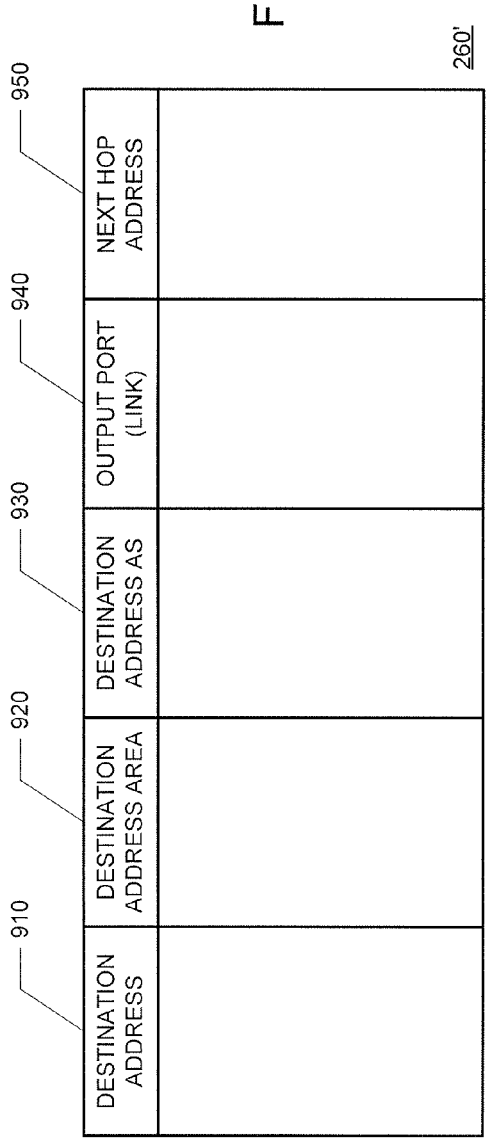
FIG. 9 is an exemplary table which illustrates values that may be stored in a conventional routing (forwarding) table.

A route selection operation 250 may then use information in the link state database 240 to generate routes 260 in the form of a packet forwarding table. These routes 260 will typically be shortest path (e.g., lowest cost) routes. FIG. 9 is an exemplary table 260' that illustrates information that may be included in a packet forwarding table 260. As shown in FIG. 9, the exemplary table 260' may include a column 910 of global (e.g., layer 3) destination addresses, a column 920 of areas in which the destination addresses are found (if the network is divided into areas), a column 930 of autonomous systems in which the destination addresses are found (if there is more than one autonomous system), a column 940 of output ports (e.g., outgoing links) for directing packets received at the router towards their destination, and a column 950 of the address(es) of the next hop(s) (e.g., layer 2 destination address(es)) in the packets' route towards the global destination address. Briefly stated, the router observes the global (e.g., layer 3) destination address of the packet, determines the next hop (e.g., layer 2) destination address needed to forward the packet towards its ultimate destination, changes the layer 2 destination address of the packet, and places the updated packet on the corresponding output port (outgoing link).

The routing protocol(s) 730 and route selection operation 750, as well as the resulting link state database 740 and routes 760 are desirable, but are not strictly necessary for the router 200 to operate in accordance with the present invention (as suggested by the phantom lines).

Similarly, the interior gateway protocol operation (with traffic engineering extensions) 232 may be use to generate a traffic engineering database (TED) 242. This database 242 includes similar information to that in the link state database 240, but may further include link attributes and node attributes for example. Some exemplary link attributes that may be included in the traffic engineering database (TED) 242 include maximum link bandwidth, maximum reservable link bandwidth, current bandwidth reservation, current bandwidth usage, link coloring, link administrative group, optical performance parameters such as signal-to-noise ratio and power dispersion, link media type compatibility, etc. FIG. 8 is an exemplary table 242' that illustrates information that may be included in a traffic engineering database (TED) 242. As shown in FIG. 8, the table 242' may include a column 810 with link source values (e.g., layer 3 node addresses), a column 820 with link destination values (e.g., layer 3 node addresses), a column 830 with link "cost" values, and one or more columns 840 with link attribute values. Information about the source and destination nodes (such as node type, node throughput, quality of service support, node queuing discipline, for example) may also be provided in the TED 242. Referring once again to FIG. 8, one or more columns 850 of source node attributes and one or more columns 860 of destination node attributes may also be provided.

The particular protocol(s) 732 used to populate the TED 242 are not particularly relevant to the present invention. Indeed, it is conceivable that the TED 242 can be generated by some other facility and then provided to the router 200 (as suggested by the phantom lines).

A path selection operation 252 may include a typical label-switched path selection operation 254 (not strictly necessary) and a constraint-based path selection operation (such as constrained shortest path first (CSPF) for example). The constraint-based path selection operation 256 may accept constraints from a configuration file 258 and/or from a message(s) forwarded from the signaling process(es) 270. Based on the contents of the traffic engineering database (TED) 242 and the constraints, the constraint-based path selection operation 256 may determine a (label-switched) path between a head-end node (e.g., label-switching router) and a tail-end node (e.g., label-switching router). At least a portion of information defining the label-switched path(s) may be stored as indicated by element 262.

Figure 10:
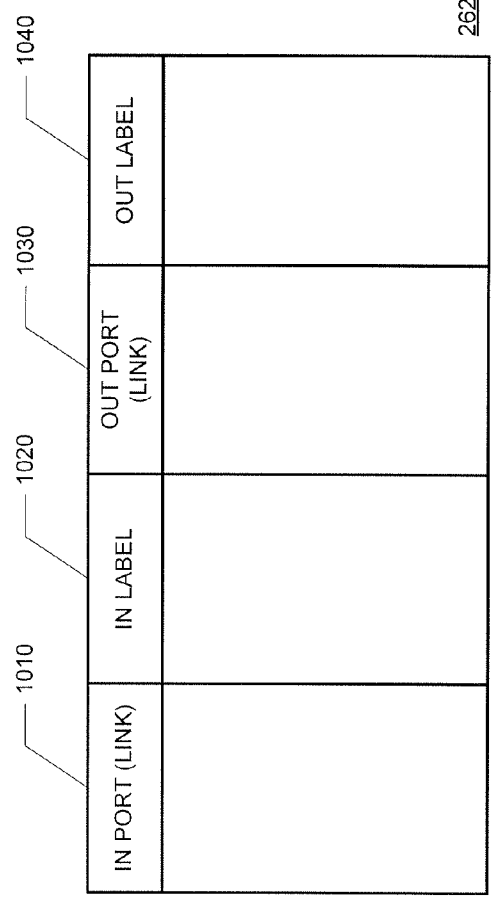
FIG. 10 is an exemplary table which illustrates values that may be stored in a label-switching table.

FIG. 10 is an exemplary table 262' illustrating information that may be contained in the label switched paths storage 262. As shown in FIG. 10, the table 262' may include a column 1010 of input port (incoming link) values, a column 1020 of labels of received packets, a column 1030 of output ports (outgoing links) values, and a column 1040 of output labels for outbound packets. Briefly stated, the router observes the input port and in label of a packet, uses the table to determine a corresponding output port and label, switches the input label to the output label, and places the updated packet on the output port.

A signaling operation 270 (e.g., RSVP) may be used to gather information about the network, to disseminate (label-switched) paths, to disseminate requests to construct (label-switched) paths, and to disseminate constraints.

Some aspects of the present invention may concern changes and/or extensions to the signaling operation 270 and/or the constraint-based routing path selection operation 256.

§4.2 Functions that May be Performed by the Present Invention

The present invention may function to permit a node (such as a head-end label switching router ("LSR") for example) to communicate constraints to other nodes. The present invention may encode such constraints in the form of a program having one or more instructions. Each of instructions may include an operation code, and operands (or pointers to locations where operands are stored). In this way, the present invention provides an extensible, interoperable way for a router to communicate constraints.

The present invention may also function to inject such constraints (e.g., as one or more CONSTRAINT objects) into signaling messages (e.g., a PATH RSVP message).

The present invention may also function to permit the determination of constrained (label-switched) paths to be distributed among a number of (label-switching) routers or other nodes. This function is useful in instances where a router or node cannot complete a path to a tail-end (label-switching) router. Such instances may arise when (i) a head-end (label-switching) router and a tail-end (label-switching) router are in different areas or different autonomous systems and the head-end (label-switching) router does not know the details of the network topology and relevant link attributes in the area or autonomous system of the tail-end (label-switching) router, (ii) a (head-end label-switching) router asked to compute a constrained (label-switched) path does not have information (e.g., link and/or node attributes) relevant to one of the constraints, and/or (iii) a (head-end label-switching) router wants to delegate the constraint-based path determination to another node (e.g., based on the present node's configuration, an internal state of the node, an internal state and/or configuration of another node, and/or a network state). The present invention may perform these functions by having each (label-switching) router, upon receiving a message with constraints (e.g., a CONSTRAINT object(s)), (i) ignore the constraints (at least those concerning link attributes) if the router is a tail-end (label-switching) router, (ii) apply the constraints to a link (and node) if the next hop in the (label-switched) path is strict, and/or (iii) perform a constraint-based path determination to a next hop if the next hop is loose.

§4.3 Exemplary Operations, Architecture, Methods and Data Structures

In the following, operations which may be performed by the present invention are introduced in §4.3.1 below. Then, architecture, methods and data structures which may be used to effect these processes are described in §4.3.2.

§4.3.1 Operations

As discussed above with reference to FIG. 2, the present invention may extend a signaling operation(s) (such as RSVP/TE for example) 270 and may control the operation of a constraint-based path selection operation (such as CSPF for example) 256 to effect one or more of the functions introduced in §4.2 above.

§4.3.2 Exemplary Embodiment(s)

Exemplary systems on which the signaling operation(s) and the constraint-based path selection operation(s) may be effected are described in §4.3.2.1 below. Then exemplary data structures which may be used by these processes are described in §4.3.2.2 below. Finally, exemplary methods which may be used to effect these operations are described in §4.3.2.3 below.

§4.3.2.1 Exemplary Architectures

Figure 3:
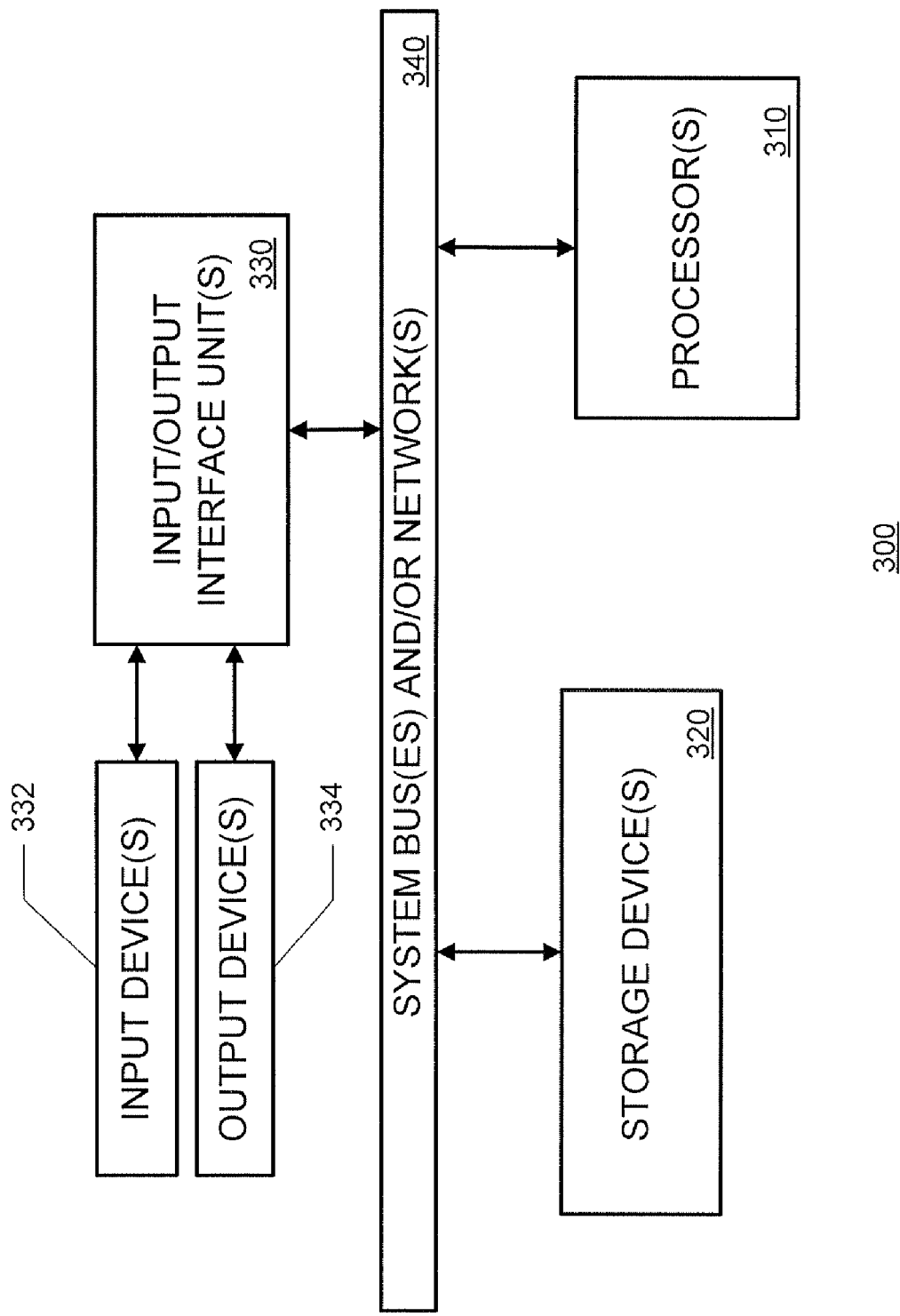
FIG. 3 is a high-level block diagram of an apparatus which may be used to effect various aspects of the present invention.

FIG. 3 is high-level block diagram of a machine 300 which may effect one or more of the processes discussed above. The machine 300 basically includes a processor(s) 310, an input/output interface unit(s) 330, a storage device(s) 320, and a system bus(es) and/or a network(s) 340 for facilitating the communication of information among the coupled elements. An input device(s) 332 and an output device(s) 334 may be coupled with the input/output interface(s) 330. Operations of the present invention may be effected by the processor(s) 310 executing instructions. The instructions may be stored in the storage device(s) 320 and/or received via the input/output interface(s) 330. The instructions may be functionally grouped into processing modules.

The machine 300 may be a label-switching router for example. In an exemplary router, the processor(s) 310 may include a microprocessor, a network processor, and/or (e.g., custom) integrated circuit(s). In the exemplary router, the storage device(s) 320 may include ROM, RAM, SDRAM, SRAM, SSRAM, DRAM, flash drive(s), hard disk drive(s), and/or flash cards. At least some of these storage device(s) 320 may include program instructions defining an operating system, a protocol daemon, and/or other daemons. In a preferred embodiment, the methods of the present invention may be effected by a microprocessor executing stored program instructions (e.g., defining a part of the protocol daemon). At least a portion of the machine executable instructions may be stored (temporarily or more permanently) on the storage device(s) 320 and/or may be received from an external source via an input interface unit 330. Finally, in the exemplary router, the input/output interface unit(s) 330, input device(s) 332 and output device(s) 334 may include interfaces to terminate communications links.

Naturally, the operations of the present invention may be effected on systems other than routers. Such other systems may employ different hardware and/or software.

§4.3.2.2 Exemplary Data Structures

Figure 11:
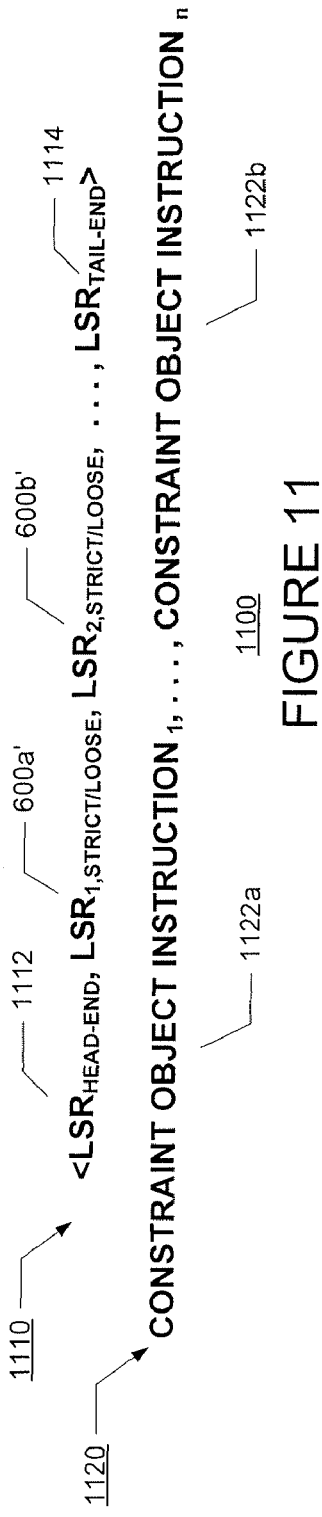
FIG. 11 is an exemplary data structure which illustrates a message carrying specified explicit nodes to be a part of a path (e.g., an ERO) extended to carry constraint object instructions.

FIG. 11 illustrates an exemplary message structure 1100 which may be used to communicate constraints (along with explicit nodes specified to be a part of the path). The message structure 1100 may include a first part 1110 for carrying any nodes (e.g., label-switching routers) explicitly specified (e.g., via an administrator, as configured) to be a part of the path, and a second part 1120 for carrying any constraints to be applied to the (label-switched) path.

The first part 1110 of the message 1100 may specify one or more explicit nodes (e.g., label-switching routers) to be used on the path between the specified head-end node (e.g., label-switching router) 1112 and the tail-end node (e.g., label-switching router) 1114. The nodes may be indicated by EXPLICIT_ROUTE objects (or "EROs") for example. As described below, the head-end label-switching router (LSR) 1112 may use an EXPLICIT_ROUTE object in an RSVP PATH message to specify a predetermined explicit router for the label-switched path (LSP), independent of conventional IP routing. Notice that the nodes may be "strict" or "loose". A node's (e.g., label-switching router's) operations in response to receipt of the message 1100 may depend on whether or not a next explicit node in the message has been specified as a "strict" node or a "loose" node.

Figure 12:
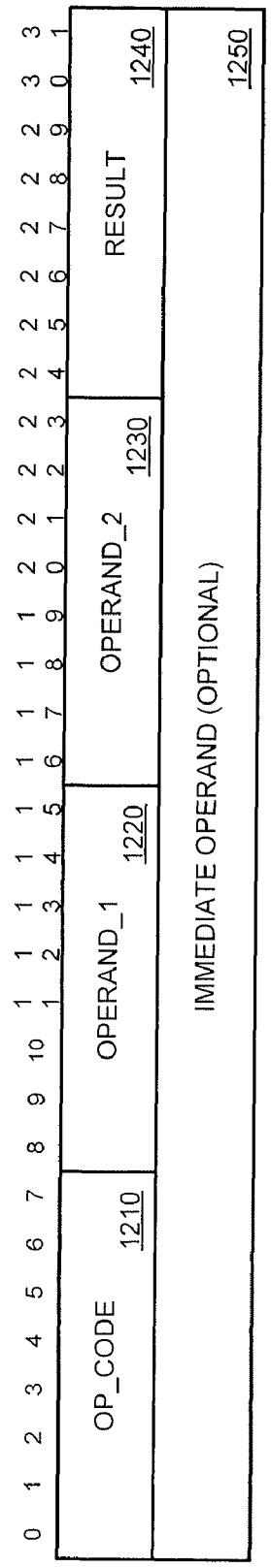
FIG. 12 is an exemplary data structure of an exemplary constraint object instruction.

A second part 1120 of the message 1100 may include one or more constraint object instructions 1122. FIG. 12 illustrates an exemplary constraint object instruction 1122' which may be carried in the second part 1120 of the message 1100. Basically, a constraint object 1120' may specify a program as a series of constraint object instructions 1122'. The output of this program may be a Boolean or a preference value. In one exemplary embodiment, a preference value may be a 32-bit integer or a floating point number in IEEE format for example. Smaller preference values are preferable.

Referring to FIG. 12, in one exemplary embodiment, OPERAND_1 1220, OPERAND_2 1230 and RESULT 1240 fields may carry pointers or indices to registers. In such an embodiment, a plurality of (e.g., 256) registers may be provided. These registers may be divided into three classes—"general purpose" registers, "attribute" registers, and "accumulation" registers. General purpose registers are readable and writable, and are used for computation. Some of the general purpose registers are also the outcome registers—when the program ends, exactly one of these registers should have a value that determines the outcome of the constraint. Attribute registers are read-only, and hold link and/or node attributes (Recall the TED 242). Accumulation registers store results and may be used, for example, to track cumulative results associated with end-to-end path constraints (such as a maximum number of hops constraint, or a maximum delay constraint, for example). Thus, accumulation registers are readable and writable. The following illustrates exemplary registers, their associated access characteristics, and their purposes:

| Index | Access | Purpose |
| --- | --- | --- |
| 0-81 | read-write | Computation |
| 82 | read-write | 32-integer outcome |
| 83 | read-write | Floating point outcome |
| 84 | read-write | Boolean outcome |
| 85 | read-only | Link Administrative Groups |
| 86 | read-only | Link Delay |
| 87-169 | read-only | Other Attributes (reserved) |
| 170-254 | read-only | Accumulation (reserved) |
| 255 | read-only | Immediate operand |

In one exemplary embodiment, register values can be one of the following types: Booleans; 32-bit strings; 32-bit 2's complement integers; or 32-bit IEEE floating point values. In such an embodiment, general purpose registers have no initial value and it is an error to read a general purpose register that hasn't been first written into.

In one exemplary embodiment, if an operand value points to or indexes register 255, this means that the value of the operand is the 32-bit value following the instruction (immediate operand). In such an exemplary embodiment, it may be illegal for both operands to refer to register 255. It may also be illegal for a pointer or index in the RESULT field 1240 to refer to a read-only register.

The following list defines exemplary valid OP_CODEs 1210, their semantics, and the result types. In this list, "x" refers to the value of OPERAND_1 1220, "y" refers to the value of OPERAND_2 1230, and "z" refers to the value of the RESULT. Further, in this list, "&" denotes a bit-wise AND operation, "|" denotes a bit-wise OR operation, "^" denotes a bit-wise XOR operation, "==" denotes a bit-wise equality operation, "~" denotes a bit-wise inversion (unary) operation, "&&" denotes a Boolean AND operation, "||" denotes a Boolean OR operation, and "!" denotes a Boolean negation (unary) operation.

| OpCode | Action | Result Type |
| --- | --- | --- |
| Illegal | | |
| 1 | z = x & y | Bit string |
| 2 | z = x\|y | Bit string |
| 3 | z = x ^ y | Bit string |
| 4 | z = ~x | Bit string |
| 5 | z = (x & y) == 0 | Boolean |
| 6 | z = (x & y) != 0 | Boolean |

-continued

| OpCode | Action | Result Type |
|---|---|---|
| 7 | z = (x & y) == y | Boolean |
| 8 | z = (x & y) != y | Boolean |
| Reserved | | |
| 10 | z = x && y | Boolean |
| 11 | z = x\|\|y | Boolean |
| 12 | z = !x | Boolean |
| Reserved | | |

In general, applying a constraint to an entity (e.g., a link or a node in a network) may yield a Boolean (True or False) result or a numerical result indicating preference. A Boolean result of True means that the entity meets the constraints; False means that it does not meet the constraints. For numerical results, whether smaller or bigger is better is defined. If a numerical constraint is applied to several alternative entities while determining a path, those entities yielding the best (smallest or biggest) results are preferred over the others.

Other instructions that are useful for expressing constraints include set operations, conditional statements and programmatic loops, as well as more global constraints such as "Find two (or more) paths that satisfy the constraints that are also node-disjoint or link-disjoint". Node-disjoint means that the paths do not have any nodes in common apart from the head-end and the tail-end; link-disjoint means that the paths have no link in common. These types of constraints assist the determination of backup paths. For example, a link-disjoint set of paths means that a link failure affects at most one of the paths.

As can be appreciated from the foregoing description, constraints may be carried by extending the EXPLICIT_ROUTE object (described below) to include a constraint object 1120, the constraint object 1120 including one or more constraint object instructions 1122.

Naturally, the second part 1120 of the message 1100 may be carried in another message, or in its own message.

§4.3.2.3 Exemplary Methods

§4.3.2.3.1 Exemplary Packet Forwarding

Figure 4:
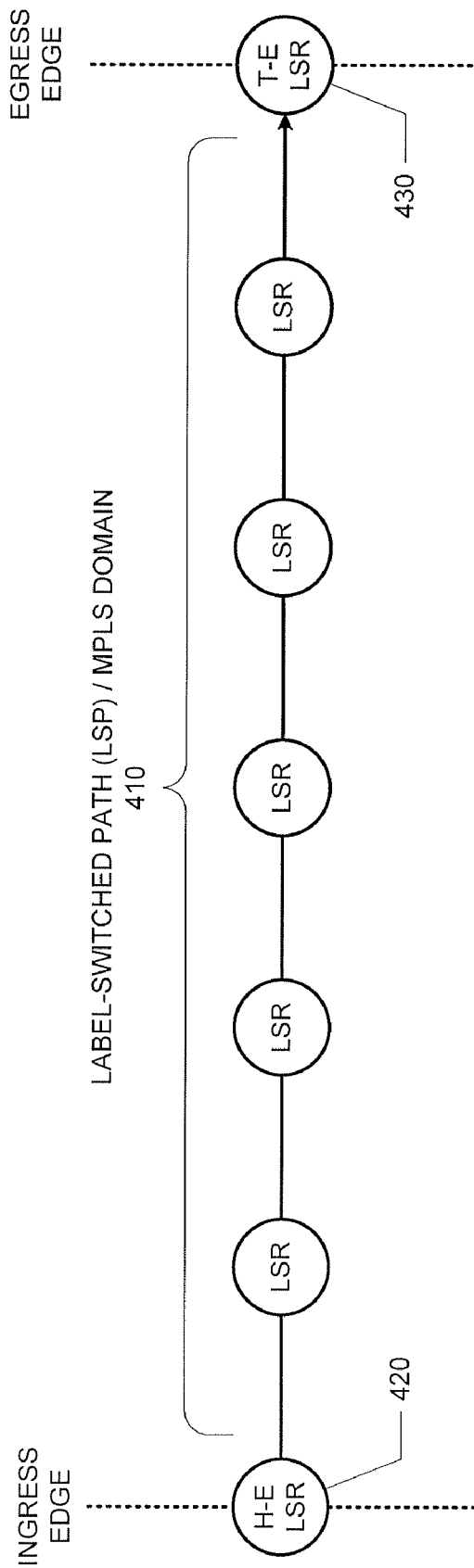
FIG. 4 illustrates a label-switched path including a head-end (or ingress) label-switching router, intermediate label-switching routers, and a tail-end (or egress) label-switching router.

In one exemplary embodiment, the packet forwarding operation 210 may be based on a label-swapping forwarding algorithm, such as MPLS for example. FIG. 4 illustrates a label switched path 410 across a network. Notice that label switched paths 410 are simplex—traffic flows in one direction from a head-end label switching router (or "LSR") 420 at an ingress edge to a tail-end label switching router 430 at an egress edge. Duplex traffic requires two label switched paths—one for each direction. Notice that a label switched path 410 is defined by the concatenation of one or more label-switched hops, allowing a packet to be forwarded from one label switching router (LSR) to another across the MPLS domain 410.

A label is a short, fixed-length value carried in the packet's header to identify a forwarding equivalence class (or "FEC"). An FEC is a set of packets that are forwarded over the same path through a network even if their ultimate destinations are different. At the ingress edge of the network, each packet is assigned an initial label. More specifically, referring to the example illustrated in FIG. 5, an ingress label switching router 510 interprets the destination address 520 of an unlabeled packet, performs a longest-match routing table lookup, maps the packet to an FEC, assigns a label 530 to the packet and forwards it to the next hop in the label-switched path.

Figure 5:
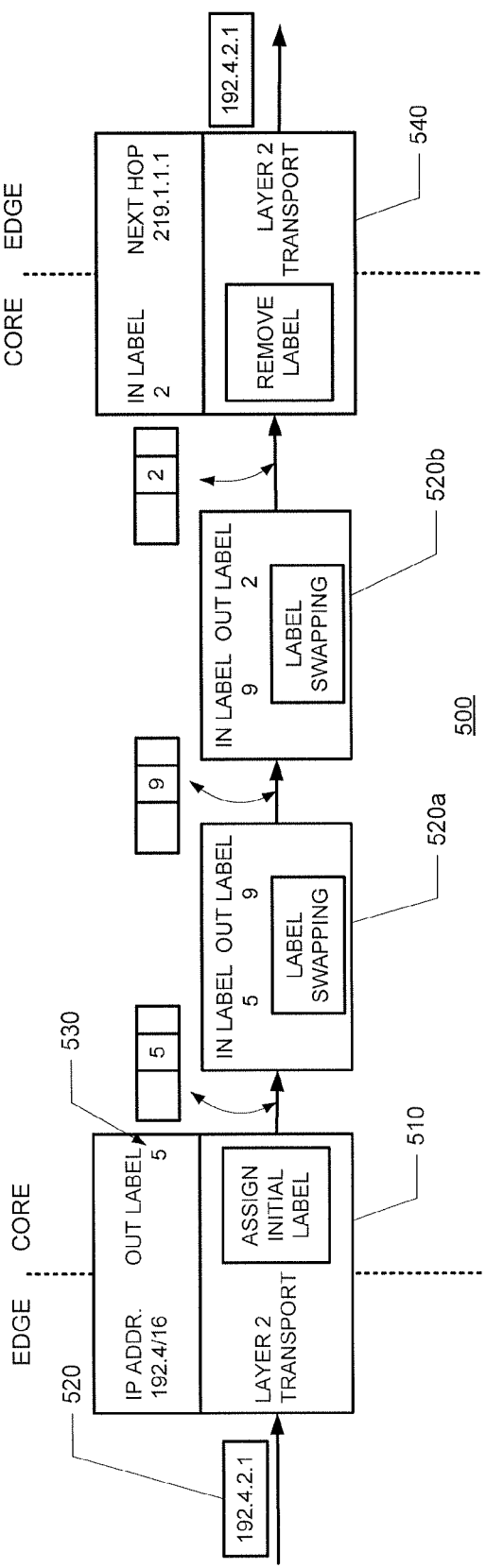
FIG. 5 illustrates label assignment, switching and removal by label-switching routers of a label switched path.

In the MPLS domain, the label switching routers (LSRs) 520 ignore the packet's network layer header and simply forward the packet using label-swapping. More specifically, when a labeled packet arrives at a label switching router (LSR), the input port number and the label are used as lookup keys into an MPLS forwarding table. When a match is found, the forwarding component retrieves the associated outgoing label, the outgoing interface (or port), and the next hop address from the forwarding table. The incoming label is replaced with the outgoing label and the packet is directed to the outgoing interface for transmission to the next hop in the label switched path. FIG. 5 illustrates such label switching by label switching routers (LSRs) 520a and 520b.

When the labeled packet arrives at the egress label switching router, if the next hop is not a label switching router, the egress label switching router discards the label and forwards the packet using conventional longest-match IP forwarding. FIG. 5 illustrates such label discarding and IP forwarding by egress label switching router 540.

The foregoing description of the packet forwarding using label switching presumed the existence of label switched paths and associated label entries in forwarding tables. However, these paths must be determined and provided to each of the label switching routers (LSRs) in the label-switched path (LSP). Generating and distributing these label-switched paths may include steps of distributing information about the network to the label switching routers (See, e.g., §4.3.2.3.2 below), path selection by the label switching routers based on such information (See, e.g., §4.3.2.3.3 below), and signaling to distribute the determined label-switched paths to the label switching routers defining such paths (See, e.g., §4.3.2.3.4 below).

§4.3.2.3.2 Exemplary Routing Protocols with Traffic Engineering Extensions

Exemplary methods for implementing the interior traffic engineering protocols with traffic engineering extensions operations 232 are now described. Information distribution may be used to provide information about network topology and network loading so that label-switched paths may be determined. The interior gateway protocol (or "IGP") 230 can be extended so that link attributes are included in each router's links-state advertisements. Such link attributes may include, for example, maximum link bandwidth, maximum reservable link bandwidth, current bandwidth reservation, current bandwidth usage and link coloring. For example, IS-IS extensions may be supported by defining new type length values (or "TLVs"), while OSPF extensions can be implemented with opaque LSAs. The standard flooding algorithm used by link-state interior gateway protocols can be used to ensure that link attributes are distributed to all routers in the network administrator's routing domain. Node attribute information may also be gathered.

Each label-switching router (or "LSR") can maintain network link attributes and topology information in a specialized traffic engineering database (or "TED") 242. The traffic engineering database (TED) 242 may be used to determine explicit paths for the placement of label-switched paths across the physical topology of the network. A separate link state database 240 may be maintained so that the subsequent traffic engineering computation is independent of the interior gateway protocol (IGP) and the IGP's link-state database. Thus, even in routers employing traffic engineering using label-switched paths, the IGP may continue to perform traditional shortest path determinations based on information contained in the link-state database 240.

§4.3.2.3.3 Exemplary Path Selection Methods

Exemplary methods for effecting constraint-based routing path selection operations 256 are now described. Each head-end label-switching router may use its traffic engineering database (TED) 242 to determine the paths for its own set of label-switched paths (LSPs) across the routing domain. The path for each label-switched path (LSP) can be represented by a strict or loose explicit route. An "explicit route" is a specified sequence of label-switching routers (LSRs) that should be part of the physical path of the label-switched path (LSP). If the head-end label-switching router (LSR) specifies all of the label-switching routers (LSRs) in the label-switched path (LSP), the LSP is said to be identified by a "strict" explicit route. If, however, the head-end label-switching router (LSR) specifies some, but not all, of the label-switching routers (LSRs) in the label-switched path (LSP), the LSP is said to be described by a "loose" explicit route. Thus, with strict explicit routing, a network administrator "hard wires" the label-switched path, whereas with loose explicit routing, the network determines some of the label-switching routers (LSRs) of the label-switched path (LSP).

The head-end label-switching router (LSR) may use a constraint-based routing technique (such as the constrained shortest path first (or "CSPF") technique for example) to determine the physical path for each label-switched path (LSP), based on information from the traffic engineering database (TED) 242. The constrained shorted path first technique is basically a shortest-path-first algorithm that accounts for specific requirements or restrictions when determining a shortest path across the network. Hence, a constrained shortest path first technique may consider (i) topology link-state information maintained in the traffic engineering database (TED) 242, (ii) attributes associated with the state of network resources maintained in the TED 242, and (iii) administrative attributes obtained from user (e.g., network administrator) configuration 258.

More specifically, as the constrained shortest path first technique considers each candidate node (i.e., candidate label-switching router (LSR)) and link for a new label-switched path, it either accepts or rejects a specific path component based on resource availability and the specified requirements or restrictions. The constrained shortest path first technique generates an explicit route including a sequence of label-switching router (LSR) addresses that provide the shortest path through the network that meets the specified requirements or restrictions. The constrained shortest path first technique is repeated for each label-switched path (LSP) that the head-end label-switching router (LSR) needs to generate. In each case, the determined explicit label-switched path (LSP) is forwarded to the label-switching routers (LSRs) of the label-switched path (LSP) using a signaling technique.

Constrained shortest path first (CSPF) is merely one example of a constraint-based routing technique. The term "constraint-based routing" should be broadly interpreted to include any routing or packet forwarding technique that considers constraints.

To reiterate, label-switched paths may be determined: (i) off-line by a network administrator to determine explicit strict routes; (ii) partially off-line and partially on-line by the network where a network administrator may determine explicit loose routes and provide requirements or restrictions and where the head-end label-switching router (LSR) "fills in" the missing parts of the label-switched path (LSP) in accordance with the specified requirements or restrictions; or (iii) on-line by the network where a network administrator merely provides requirements or restrictions and where the head-end label-switching router (LSR) determines the entire label-switched path (LSP) in accordance with the specified requirements or restrictions.

On the one hand, on-line label-switched path (LSP) determination by the network is advantageous because it is relatively simple and does not require the network administrator to have a high level of expertise. Moreover, it is more reactive—if a link fails, the head-end can learn of the failure and re-compute the path, while accounting for the failure. On the other hand, however, on-line label-switched path (LSP) determination by the network is disadvantageous because it is not deterministic—the order in which label-switched paths (LSPs) are determined affects the label-switched paths (LSPs) selected. For example, label-switched paths (LSPs) determined earlier have more available resources than those determined later because the previously determined label-switched paths may have reserved network resources.

The constrained shortest path first technique extends an interior gateway protocol (IGP) and therefore presumes that the topology of the network is known. However, this will not be the case in instances where the head-end and tail-end label switching routers are in different areas of an autonomous system (in which case hierarchical routing obscures details of network topology outside a given area), or in instances where the head-end and tail-end label switching routers are in different autonomous systems (in which case exterior gateway protocols, such as the border gateway protocol (or "BGP") are used). Also, some link attributes may not be known (i.e., may not be stored in the traffic engineering database (TED)). Finally, there may be instances in which a label-switching router may want to delegate constraint-based routing determinations to another (e.g., downstream label-switching router (LSR)) network component. In such instances, path determination is delegated (and constraints are carried) to another node.

§4.3.2.3.4 Exemplary Signaling Methods

Exemplary methods that may be used to effect at least a part of the signaling operations 270 are now described. Since the information residing in the traffic engineering database (TED) 242 of the head-end label-switching router (LSR) may become out-of-date, when the head-end label-switching router (LSR) uses the constrained shortest path first (CSPF) technique 256' to determine a label-switched path, it may have relied on stale information. Accordingly, the candidate label-switched path (LSP) is not known to be workable until it is actually established by the signaling component. In one exemplary embodiment, signaling may be effected by a number of extensions to the resource reservation protocol (or "RSVP"). This topic is discussed in the white paper, Chuck Semeria, "RSVP Signaling Extensions for MPLS Traffic Engineering," *Part Number* 200006-002, pp. 1-29, Juniper Networks, Inc. (2000). This white paper is expressly incorporated herein by reference. Basically, RSVP uses "PATH" and "RESV" messages to establish a label-switched path (LSP).

More specifically, a PATH message may be transmitted by the head-end label-switching router (LSR) towards the tail-end label-switching router (LSR) when it wants to establish a label-switched path (LSP), such as one determined in accordance with the constrained shortest path first (CSPF) technique. The PATH message is addressed to the tail-end label-switched router (LSR) but contains the "Router Alert IP" option (See, e.g., RFC 2113, expressly incorporated herein by reference) in its IP header to indicate to intermediate routers that the datagram requires special processing by them. That is, the head-end label-switching router (LSR) may generate an RSVP PATH message containing a LABEL_REQUEST object that asks intermediate label-switching routers (LSRs) and the tail-end label-switching router (LSR) to provide a label binding for the path. If the LABEL_REQUEST is not supported by any of the label-switching routers (LSRs) along the proposed label-switched path (LSP), the first LSR on the path that does not support the LABEL_REQUEST object will notify the head-end label-switching router (LSR).

The RESV message is transmitted from the tail-end label-switching router (LSR) towards the head-end label-switching router (LSR) in response to the PATH message. The RESV message establishes path state in each label-switching router (LSR) of the label-switched path (LSP) by distributing label bindings, requesting resource reservations along the path and specifying a reservation style. That is, when the tail-end label-switching router receives the PATH message containing the LABEL_REQUEST object, it responds by transmitting a RESV message that contains a LABEL object. The LABEL object contains the label binding that the downstream label-switching router (LSR) communicates to its upstream neighbor. Thus, the RESV message is send upstream towards the head-end label-switching router (LSR) in a direction opposite to that taken by the PATH message. Each label-switching router (LSR) that processes the RESV message carrying a LABEL object uses the received label for outgoing traffic associated with the specific label-switched path (LSP). When the RESV message arrives at the head-end label-switching router (LSR), the proposed label-switched path (LSP) is established.

The present invention may be used with an RSVP object that may be carried by a PATH message—namely the EXPLICIT_ROUTE object (or "ERO"). The head-end label-switching router (LSR) may use an EXPLICIT_ROUTE object in the PATH message to specify a predetermined explicit router for the label-switched path (LSP), independent of conventional IP routing. An explicit route may be encoded as a series of subobjects contained in the EXPLICIT_ROUTE object. Each subobject may identify a group of nodes in the explicit route or specify an operation to be performed along the path.

Figure 6:
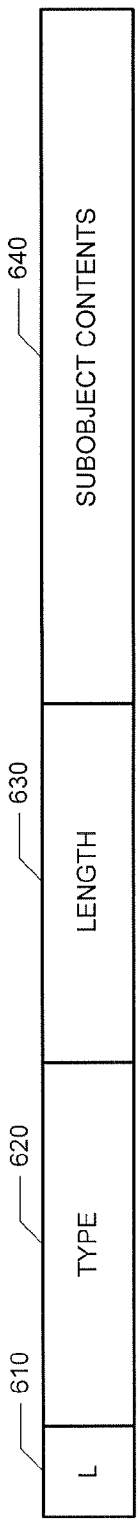
FIG. 6 illustrates an EXPLICIT_ROUTE object which is an exemplary message for specifying explicit nodes in a route.

FIG. 6 illustrates an exemplary way to encode a subobject 600 of an EXPLICIT_ROUTE object. The L-bit 610 indicates whether or not the subobject represents a loose hop ("1") or a strict hop ("0"). Field 620 identifies the type of the subobject, field 630 provides the length of the subobject, and field 640 carries the contents of the subobject.

§4.3.2.3.5 Exemplary Constraint Signaling Methods

To reiterate, the constrained shortest path first technique introduced above extends an interior gateway protocol (IGP) and therefore presumes that the topology of the network is known. However, this may not be the case in instances where the head-end and tail-end label switching routers are in different autonomous systems (in which case exterior gateway protocols, such as the border gateway protocol (or "BGP") are used). That is, an extended interior gateway protocol (IGP) in one autonomous system will probably not provide nodes in that system with details about another autonomous system. Referring back to FIG. 1, assume that node 182 is the head-end label-switching router and that node 194 is the tail-end label-switching router. Although the head-end label-switching router (LSR) 182 can use an extended interior gateway protocol (IGP) to learn the details of topology and link characteristics within its area 154b, such an extended interior gateway protocol (IGP) will probably not provide it with such details about the autonomous system 110 including the tail-end label-switching router 184.

Even within an autonomous system, an extended interior gateway protocol (IGP) will not provide the head-end label-switching router (LSR) with the necessary details in instances where the head-end and tail-end label switching routers are in different areas of an autonomous system (in which case hierarchical routing obscures details of network topology outside a given area). For example, referring to FIG. 1, node 182 may be the head-end label-switching router (LSR) and node 184 may be the tail-end label-switching router (LSR). Although the head-end label-switching router (LSR) 182 can use an extended interior gateway protocol (IGP) to learn the details of topology and link characteristics within its area 153b, such an extended interior gateway protocol (IGP) will probably not provide it with such details about the backbone area 152 or the area 154c including the tail-end label-switching router 184.

Further, even within an autonomous system or within an area, some link attributes might not be discovered (e.g., via an extended interior gateway protocol (IGP)) and stored (i.e., in the traffic engineering database (TED)). An example of an environment in which this situation may arise is one which employs both routers and switches, such as optical switches for example. The network administrator may define some constraints regarding any optical paths, such as a particular power density, a particular wavelength, other optical performance parameters, etc. Further, an optical path may be a required or preferred path for a particular label-switched path. However, extended interior gateway protocols do not presently convey information such as switch attributes, optical link attributes, etc.

Finally, there may be instances in which a label-switching router may want to delegate constraint-based routing determinations to another (e.g., downstream label-switching router (LSR)) network component. Unfortunately, however, extended signaling protocols do not presently support such a delegation. Further, different label-switching routers (LSRs) in the label-switched path (LSP) may have different notions of constraint semantics.

Exemplary methods for extending or adding to the signaling operation 270 for purposes of signaling constraints, as well as for performing extensions to the path selection operation 252 to consider constraints, are described in §§4.3.2.3.5.1 and 4.3.2.3.5.2, respectively, below.

§4.3.2.3.5.1 Exemplary Constraint Object Signaling (Extension) Methods

Figure 13:
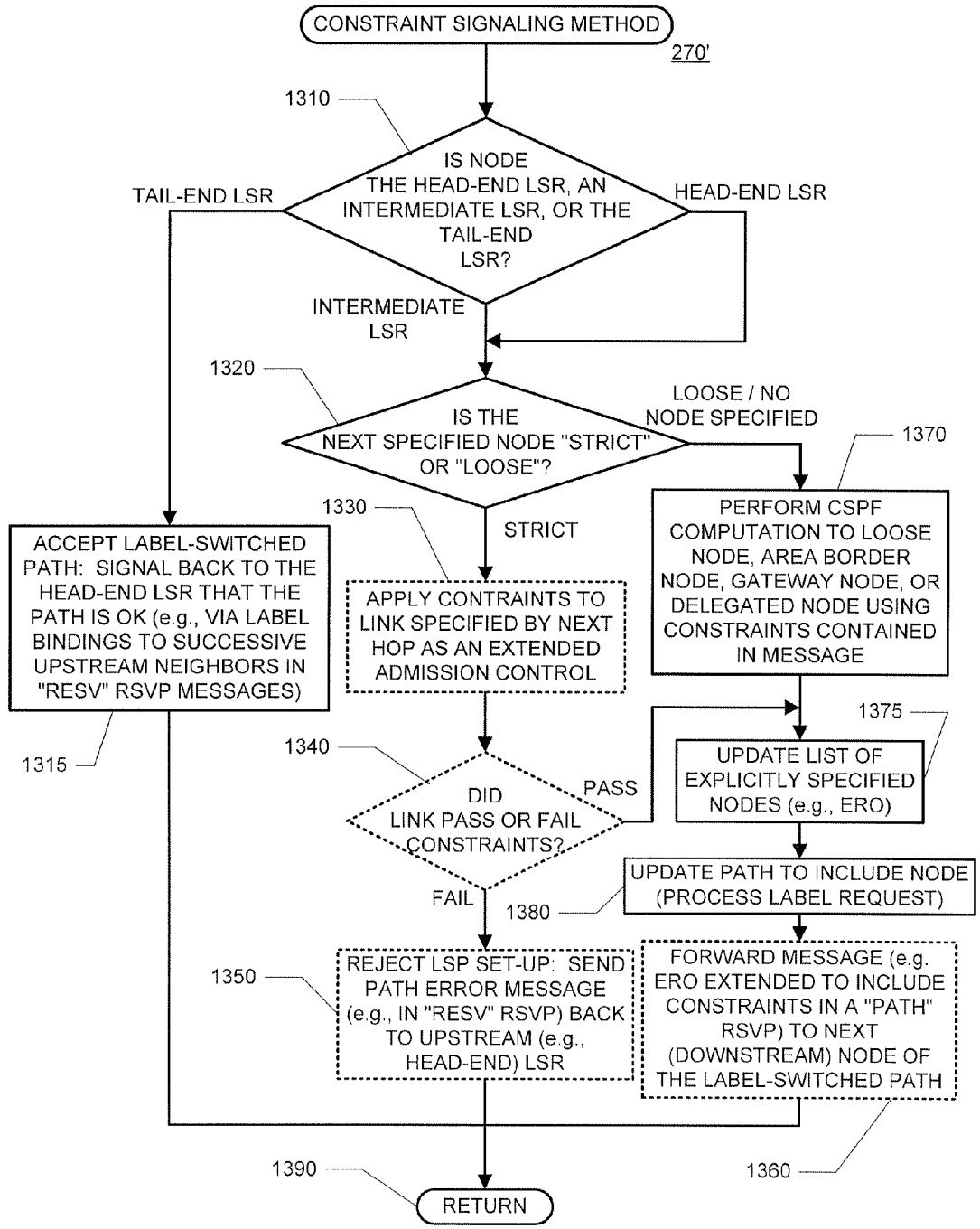
FIG. 13 is a high-level flow diagram of an exemplary method that may be used to signal constraints.

FIG. 13 is a high level flow diagram of an exemplary method 270' for signaling constraints, that may be used to effect at least a part of the signaling process(es) 270. The method 270' basically accepts constraints to the (label-switched) path and any explicit nodes specified to be made part of the (label-switched) path. At conditional branch point 1310, it is determined whether or not the present node 200' is the head-end node, the tail-end node, or some intermediate node.

If the node is the tail-end node (e.g., label-switching router), then it merely signals back to the head-end node (e.g., label-switching router) that the path is OK, as shown by block 1315. Such signaling may be effected by label bindings initiated by "RESV" RSVP messages to successive upstream neighboring nodes. Actually, even the tail-end node may have to check any constraints concerning node attributes (if not already checked by an upstream node) and/or end-to-end path constraints. In this case, a tail-end node may perform a function similar to extended admission controls described below.

Returning to conditional branch point 1310, if the node is the head-end node or an intermediate node in the (label-switched) path, the method 270' proceeds to conditional branch point 1320 where it is determined whether or not the next explicitly specified node, if any, is a "strict" hop or a "loose" hop. If no node is explicitly specified, the tail-end node may be treated as a loose hop. If the next explicit node listed is a loose hop (the tail-end node is considered to be a loose hop next node unless specified otherwise), or if no further nodes have been explicitly specified, then the method 270' branches to block 1370 where the constraint-based route is determined to the loose hop (which may be the tail-end node), if possible and if not delegated to another node. If a path to the loose-hop node cannot be determined (e.g., because the loose-hop node is in another area or another autonomous system, or because link and/or node attributes related to a constraint are not known by the present node), or if the constraint-based routing path determination is to be delegated to another node, a constraint-based path is determined to the area border node, an autonomous system gateway node, or a delegated node, respectively.

The list of specified explicit nodes is then updated, with determined nodes in the (partial) path being indicated as strict-hops as indicated by block 1375. Upstream nodes may be discarded from the list. This list may be an EXPLICT_MESSAGE object as defined in the RSVP signaling protocol. The earlier instance of the list of specified explicit nodes may be preserved (saved).

As shown in block 1380, the path is updated to include the present node (e.g., by processing a label request). A message (with the new list of specified explicit nodes) carrying the constraints is then forwarded towards the node at the end of the (partial) path as shown by block 1360, before the method 270' is left via RETURN node 1390. Although the list of specified explicit nodes and constraints have been described as being a part of a single message, naturally, the constraints can be signaled separate from the list and, indeed, the constraints can be signaled separate from one another.

Referring back to conditional branch point 1320, if the next explicitly listed node is a strict hop, the constraints may be applied to the link specified by the next hop to effect an extended admission control as indicated by block 1330. If the next hop fails to meet the constraints, a path error message may be sent back towards the head-end node as indicated by conditional branch point 1340 and block 1350, before the method 270' is left via RETURN node 1390. Note that this path error message need not propagate all the way back to the head-end node (e.g., label-switching router). It could go back to any other upstream node. If earlier instances of the list of specified explicit nodes were saved by the upstream nodes, any one of such upstream nodes could try to determine another path. Thus, the extent (e.g., number of nodes) of backtracking until a new constraint-based path is determined in the event of a path error may be a tunable parameter. Otherwise, if the next hop meets the constraints (and cumulative constraints are met), the list of explicitly specified nodes may be updated (e.g., by removing upstream nodes from the list) as indicated by block 1375. The path may be updated to include the present node (e.g., by processing a label request) as indicated by conditional branch point 1340 and block 1380. A message (with the new list of explicit nodes) carrying the constraints is then forwarded towards the node at the end of the (partial) path as shown by block 1360, before the method 270' is left via RETURN node 1390.

Notice that the signaling method 270' proposed can be implemented as an extension to the RSVP signaling protocol. More specifically, downstream messaging may be carried in "PATH" RSVP messages, and specified explicit nodes may be listed in EXPLICIT_ROUTE objects. Upstream messaging may be carried in "RESV" RSVP messages. The signaling method 270' can also be implemented as an extension to the constraint-routed label distribution protocol (or "CR-LDP"). In this case, downstream messaging could be carried in "REQUEST" CR-LDP messages and upstream messaging could be carried in "MAPPING" CR-LDP messages. Naturally, the signaling method 270' may be applied as an extension to other label distribution or path signaling protocols.

Further, notice that the signaling method 270' was described as being used to define nodes in a label-switched path, such as one defined in accordance with the multi-protocol label switching (or "MPLS") protocol. Naturally, the signaling method 270 could be adapted cover other protocols for setting up virtual circuits, such as those used to define virtual circuits in multi-protocol lambda switching (or "MPλS"), or PNNI which is used to set up virtual circuits in the asynchronous transfer mode (or "ATM"), or any other defined path.

The CONSTRAINT object may be a subobject of a signaling message of a known signaling protocol (e.g., RSVP, the label distribution protocol (or "LDP"), etc.). In the context of RSVP for example, the CONSTRAINT object may be a subobject of the PATH message. The CONSTRAINT object may be used to carry one or more sequences of instructions.

CONSTRAINT objects may be used based on the next hop specified in an explicit route (e.g., defined in an EXPLICIT_ROUTE object (or "ERO")). If the node (e.g., a label-switching router) receiving the CONSTRAINT objects is defined as the tail-end of the label-switched path, then the CONSTRAINT objects (at least constraints related to link parameters) may be ignored. This is because the tail-end of the label-switched path will be predefined. Naturally, end-to-end path constraints or constraints related to node parameters may be checked. If the node is not the tail-end node and the next hop is strict, the CONSTRAINT objects may be applied to the link specified by the next hop as an extended admission control—if the link fails to meet the constraints, the node may reject the label-switched path (LSP) setup and send path error message back to the head-end (or some other upstream) label-switching router (LSR). If, on the other hand, the next hop is loose, the node may preferably perform a constraint-based routing path computation to the next hop using the constraints specified by the CONSTRAINT objects.

A node (e.g., LSR) can apply the constraints as part of its admission control. Although most constraints (apart from bandwidth) change rarely, this application may be useful in some contexts.

If a constraint object is to be used for extended admission control, the constraint program should output a Boolean value. The Attribute registers may be initialized with values from the network entity to which the constraint is being applied, e.g. the outgoing link and/or the next node. In the case of admission control, the next hop specified (e.g., in the EXPLICIT_ROUTE object) will generally be a strict hop. The program is then run. If the outcome is "False", the entity fails admission control, and a path error message should be returned.

If a constraint object (or objects) are to be used for further path computation (as in multi-area constraint-based routing, or delegated path computation), the node (e.g., LSR) designated to do the computation may perform a constrained path computation (possibly a variation of Dijkstra's Shortest Path algorithm) with the following modification. Before a network entity is considered as a candidate, its attributes may be used to initialize the attribute registers. Then the constraint programs are run. If any program ends with a Boolean outcome of "False", the entity is discarded (in which case the rest of the constraint programs need not be run). If all the Boolean outcomes are "True", the ordered list of preference outcomes in the order of the constraint programs yielding those outcomes is associated with the entity, and can be used for tie-breaking path selection. For convenience, all constraint objects with Boolean outcomes may be listed ahead of the constraints with quantitative outcomes.

In any event, referring to both block 1370 of FIG. 13 and operation 252 of FIG. 2, a path is determined, subject to constraints (as signaled). Exemplary methods for determining a path subject to constraints are described in §4.3.2.3.2 below.

§4.3.2.3.5.2 Exemplary Path Selection Extension Methods

Constraint-based routing path determination may be performed using known techniques such as constrained shortest path first (CSPF). In general, CSPF may select a path by:

Computing label-switched paths (LSPs) one at a time, beginning with the highest priority LSP (the one with the lowest setup priority value). Among LSPs of equal priority, CSPF may start with those that have the highest bandwidth requirement.

Pruning the topology of the traffic engineering database (TED) of all links that do not have sufficient reservable bandwidth.

If the label-switched path (LSP) configuration includes link or node constraints, then pruning all links or nodes that do not meet the specified constraints.

Finding the shortest path towards the LSP's egress (e.g., tail-end) node while accounting for explicit path constraints. (For example, if the path must pass through node A, two separate SPFs are computed—one from the ingress (e.g., head-end) node to node A, and the other from node A to the egress (e.g., head-end) node.

If several paths have equal cost, then choosing the one having a last hop address that is the same as the destination of the LSP.

If several equal-cost paths remain, selecting the one with the fewest number of hops.

If several equal-cost paths remain, applying a load-balancing rule configured on the LSP.

Such known techniques may use link and/or node attributes contained in the traffic engineering database (TED) 242.

Figure 14:
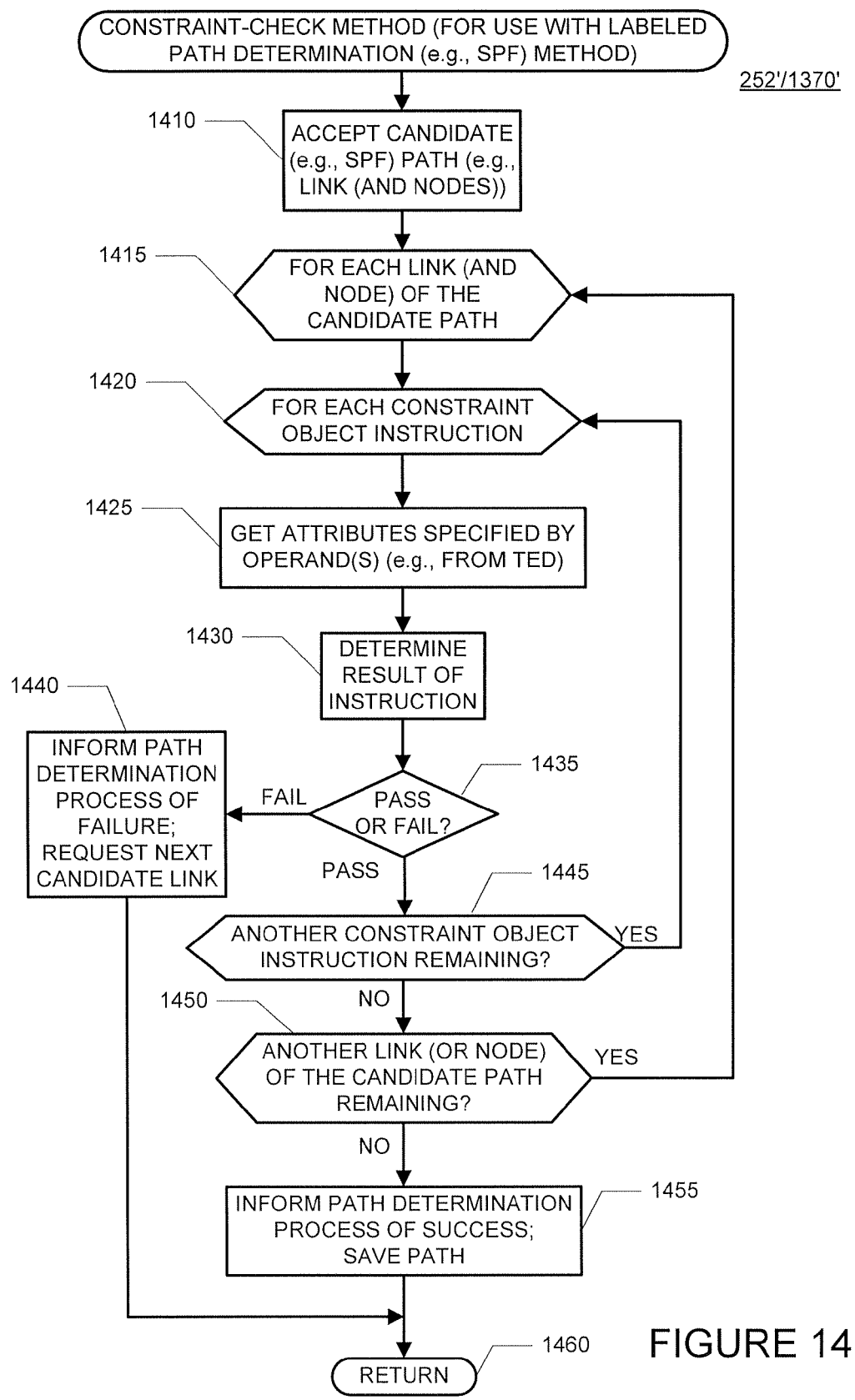
FIG. 14 is a high-level flow diagram of an exemplary method that may be used to apply constraints in a path determination process.

FIG. 14 is a high level flow diagram of a first exemplary method 252'/1370' which may be used to apply constraints to a (label-switched) path determination. First, a candidate path (e.g., consisting of links and nodes) is accepted. As indicated by loop 1415-1450, for each link (and node) of the candidate path, a number of acts are performed. More specifically, as indicated by loop 1425-1445, for each of the constraint object instructions, (the attributes specified by the operands are retrieved (e.g., from the traffic engineering database (TED)) as indicated in block 1425) the result of the instruction is determined as indicated in block 1430. Once a "fail" result is determined, the path determination operation may be informed that the candidate path does not meet the constraints and a next candidate path can be requested as indicated by decision branch point 1435 and block 1440. If, on the other hand, if a "pass" result is determined other remaining constraint instructions are checked. If all of the links (and nodes) of the candidate path pass all of the relevant constraints (naturally, node constraints are applied to nodes of the candidate path and link constraints are applied to links of the candidate path), then the path determination operation is informed of the success and the path is saved as indicated by block 1455.

Notice that the method 252'/1370' applied the constraint instructions to links (or nodes), as appropriate. Thus, the method 252'/1370' accounts for "link local" or "node local" constraints. Note, however, that there may be global (or end-to-end) "path" constraints to be met. If this is the case, the candidate path may be checked against global "path" constraints, either (a) after the block 1410, before the nested loops, (b) against accumulated results within the nested loops, or (c) after the nested loops, before block 1455. Recall further that the method 270' may determine more than one partial path, to be concatenated together. Global path constraints may be applied as a partial path is extended (e.g., by checking results stored in the accumulation registers).

Figure 15:
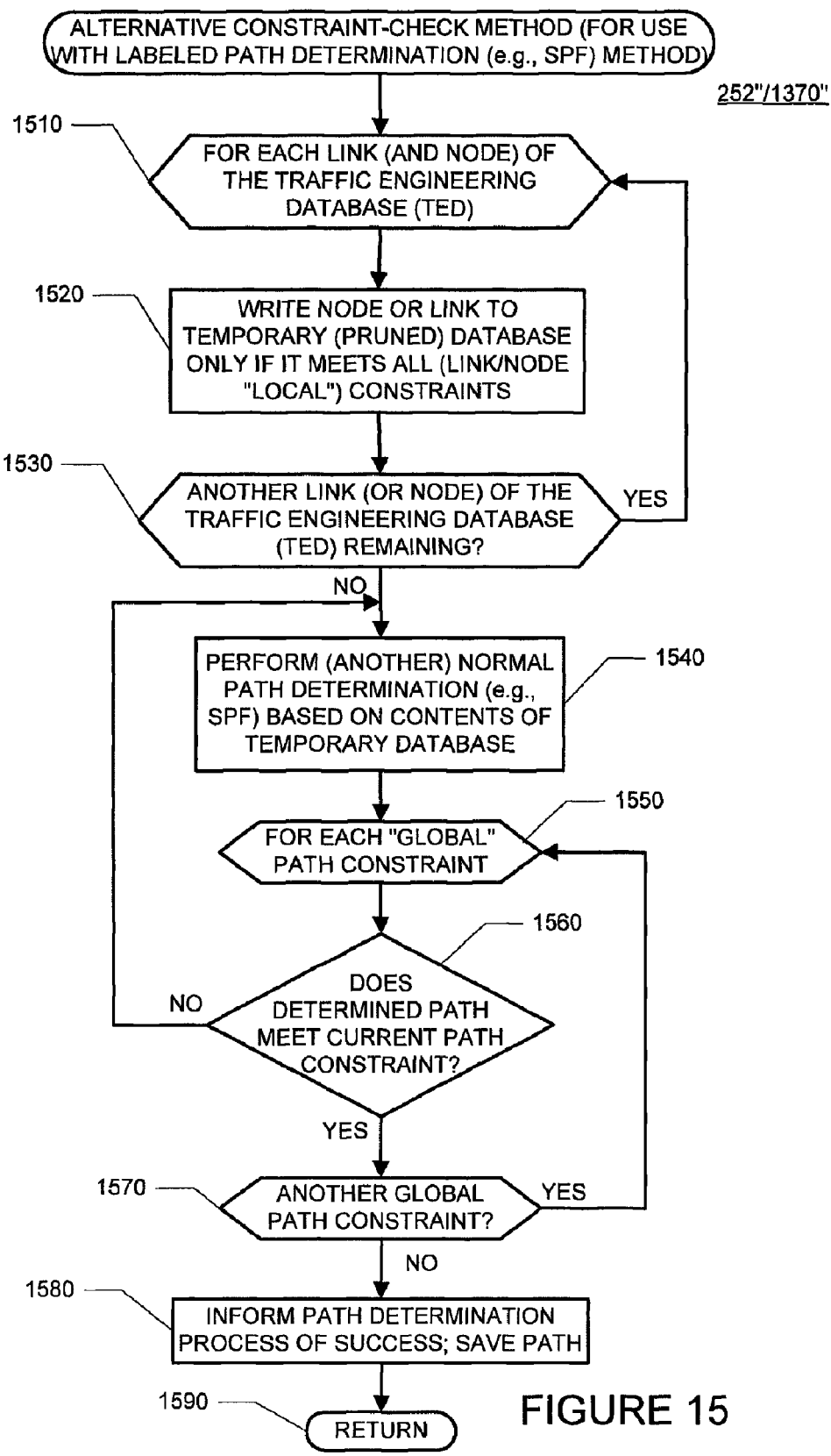
FIG. 15 is a high-level flow diagram of an alternative exemplary method that may be used to apply constraints in a path determination process.

FIG. 15 is a high level flow diagram of a method 252"/1370" which may be used to apply constraints to a path determination process. As indicated by the loop 1510-1530 through each link (and node) of the traffic engineering database (TED), a node or link is written to a temporary ("pruned TED") database only if it meets all link (and node) "local" constraints. Then in block 1540, a normal path (e.g., SPF) determination is performed based on the contents of the temporary database (pruned TED).

At this point, only the link (and node) "local" constraints have been considered. To reiterate, there may be one or more "global" (or end-to-end) path constraints. Thus, as indicated by loop 1550-1570, for each such global path constraint, it is determined whether or not the determined path meets the current path constraint, as indicated by decision branch point 1760. If not, the method 252"/1370" branches back to block 1540 to determine another path. If, on the other hand, the determined path meets each and every one of the global path constraints, then that path is used (e.g., the path determination operation is informed of the successful path determination and the path is saved) as indicated by block 1580 and the method 252"/1370" is left via RETURN node 1580.

Having described exemplary processes, data structures, apparatus and methods for effecting various aspects of the present invention, examples which illustrate various operations of exemplary embodiments of the invention are now provided in §4.4 below.

§4.4 Examples of Operations in an Exemplary Embodiment

FIGS. 16A through 16E illustrate an exemplary network 1600 which is used to illustrate an operation of an exemplary embodiment of the present invention. The network 1600 includes nodes "A" through "G" which may be label-switching routers (LSRs). The links are denoted with their end point nodes (e.g., $link_{A,B}$), are assumed to be full duplex and are assumed to have the same attributes in each direction. The links are assigned the following attributes:

| LINK | COST | BANDWIDTH | CURRENT BANDWIDTH USAGE |
|---|---|---|---|
| $Link_{A,B}$ | 5 | 100 Mbps | 10 Mbps |
| $Link_{A,F}$ | 5 | 100 Mbps | 15 Mbps |
| $Link_{B,C}$ | 5 | 200 Mbps | 0 Mbps |
| $Link_{B,D}$ | 5 | 200 Mbps | 10 Mbps |
| $Link_{C,E}$ | 5 | 200 Mbps | 50 Mbps |
| $Link_{C,F}$ | 1 | 25 Mbps | 10 Mbps |
| $Link_{D,F}$ | 5 | 150 Mbps | 15 Mbps |

-continued

| LINK | COST | BANDWIDTH | CURRENT BANDWIDTH USAGE |
|---|---|---|---|
| $Link_{F,E}$ | 1 | 100 Mbps | 10 Mbps |
| $Link_{E,G,1}$ | 2 | 100 Mbps | 10 Mbps |
| $Link_{E,G,2}$ | 1 | 200 Mbps | 50 Mbps |
| $Link_{F,G}$ | 5 | 150 Mbps | 10 Mbps |

Further assume that the two links between node E and node G are optical links, each having a signal-to-noise ratio (or "SNR") of at least 0.99. It is assumed that only node E and node G know (e.g., store in their TED) this attribute of these optical links; the other nodes are assumed to have no knowledge about certain properties of optical links. Finally, assume that node A is the head-end LSR, node G is the tail-end LSR, assume that there is a minimum bandwidth constraint of 100 Mbps, a constraint of current bandwidth usage of less than 20 Mbps, a total hop count of less than 10 hops, and a requirement of a signal-to-noise ratio of at least 0.97 for any optical links used, and assume that an EXPLICIT-ROUTE object (ERO) of $\{B_s, F_l\}$, where an "s" subscript denotes a strict hop and an "l" subscript denotes a loose hop, is specified.

Figure 16A:
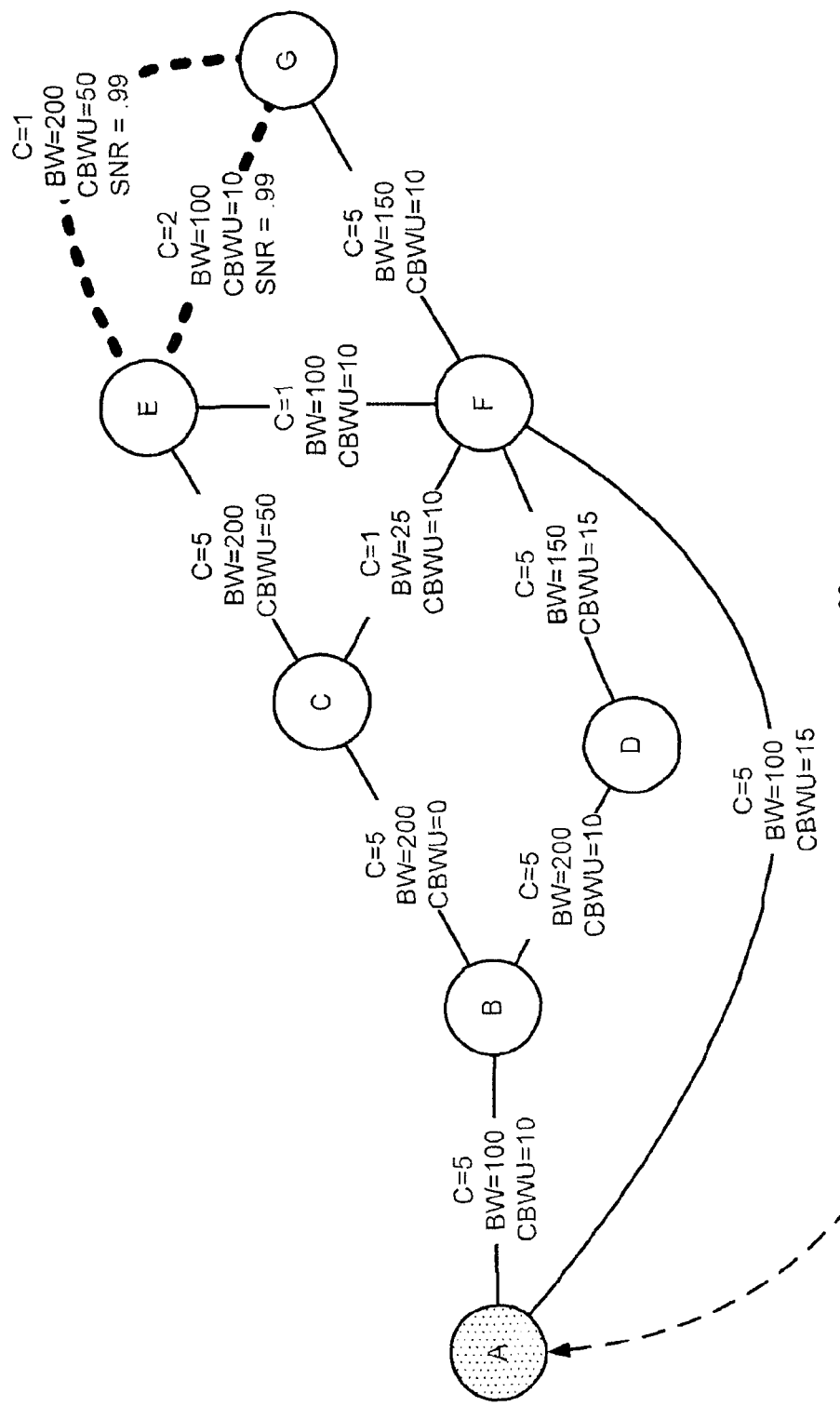

Referring first to FIG. 16A, at node A, the EXPLICIT_ROUTE object (ERO) specifies that node B is a strict hop. Thus, $link_{A,B}$ may be checked to determine whether it meets the minimum bandwidth constraint of 100 Mbps and has less than 20 Mbps of current usage. Since it meets these constraints, the ERO is updated to remove the $B_s$ node (Recall, though, that the earlier instance of the ERO may be saved. This may be done at each node), node A processes a label request to node B, and the EXPLICIT_ROUTE object, extended to include the constraints, is forwarded to node B. (Recall blocks 1310, 1320, 1330, 1340, 1375, 1380 and 1360 of FIG. 13.) This message may take the form of: $\{F_l\}$ BW≧100 Mbps, CBWU<20 Mbps, hops≦10, Optical SNR≧0.97. Notice that the $link_{A,F}$ could not be used, even in view of its relatively low cost and its meeting all specified constraints, since node B was specified as a strict hop explicit node.

Referring to FIG. 16B, at node B, the next node specified in the EXPLICIT_ROUTE object is $F_l$. Since node F is specified as a loose hop, node B generates a constraint-based route to node F. Although the path B, C, F would be the least expensive (cost=5+1=6), $link_{C,F}$ does not meet the 100 Mbps constraint. The path B, D, F meets that constraint, and each link meets the current bandwidth used constraint of less than 20 Mbps. Other constraints (e.g., hops≦10) may be checked as well. Node B processes a label request to node D, and the EXPLICIT_ROUTE object is updated to make the nodes of the determined path strict (and to remove upstream nodes), and the EXPLICIT_ROUTE object, extended to include the constraints, is forwarded to node D. (Recall blocks 1310, 1320, 1370, 1375, 1380, and 1360 of FIG. 13.) This message may take the form of: $\{D_s, F_s\}$ BW≧100 Mbps, CBWU<20 Mbps, hops≦10, Optical SNR≧0.97.

Figure 16C:
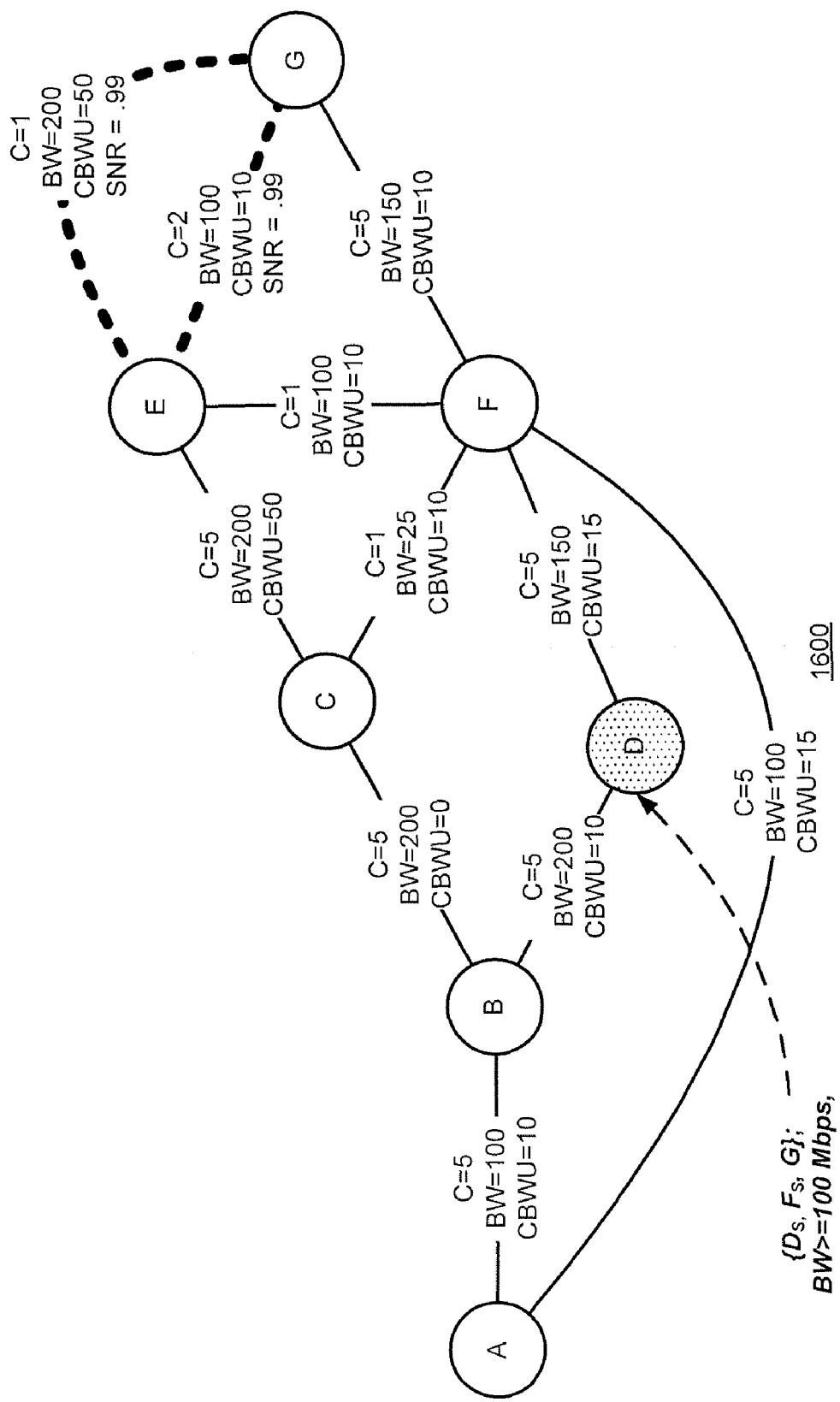

Referring to FIG. 16C, at node D, the EXPLICIT_ROUTE object (ERO) specifies that node F is a strict hop. Thus, $link_{D,F}$ may be checked to determine whether it meets the minimum bandwidth constraint of 100 Mbps and the constraint of less than 20 Mbps current bandwidth used. Other constraints (e.g., hops≦10) may be checked as well. Since the constraints are met, the ERO is updated to remove the $D_s$ node, node D processes a label request to node F, and the EXPLICIT_ROUTE object, extended to include the constraints, is forwarded to node F. This message may take the form of: { } BW≧100 Mbps, CBWU<20 Mbps, hops≦10, Optical SNR≧0.97.

Figure 16D:
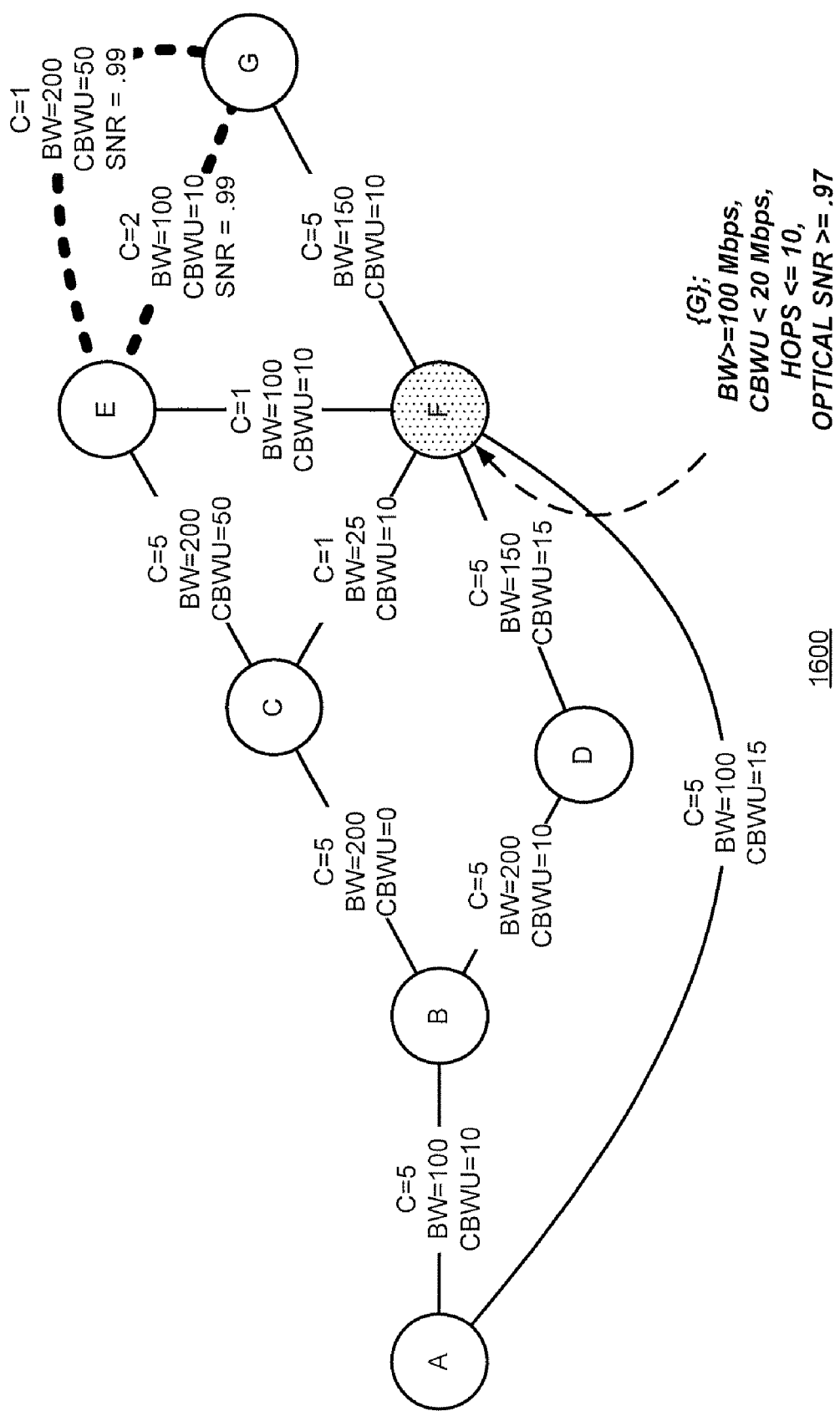

Referring to FIG. 16D, at node F, since there are no more nodes specified in the EXPLICIT_ROUTE object, node F simply attempts to generate a constraint-based route to the tail-end node G. However, note that it cannot check the minimum signal-to-noise ratio related to optical links since it does not have such attributes (e.g., in its TED). Nodes E and G have such information. Since the cost of $link_{E,F}$ is less than that of $link_{F,G}$, a partial path to node E is determined. The EXPLICIT_ROUTE object is updated to include node E as a strict hop, node F processes a label request to node E, and the EXPLICIT_ROUTE object, extended to include the constraint, is forwarded to node E. This message may take the form of: $\{E_s\}$ BW≧100 Mbps, CBWU<20 Mbps, hops≦10, Optical SNR≧0.97.

Figure 16E:
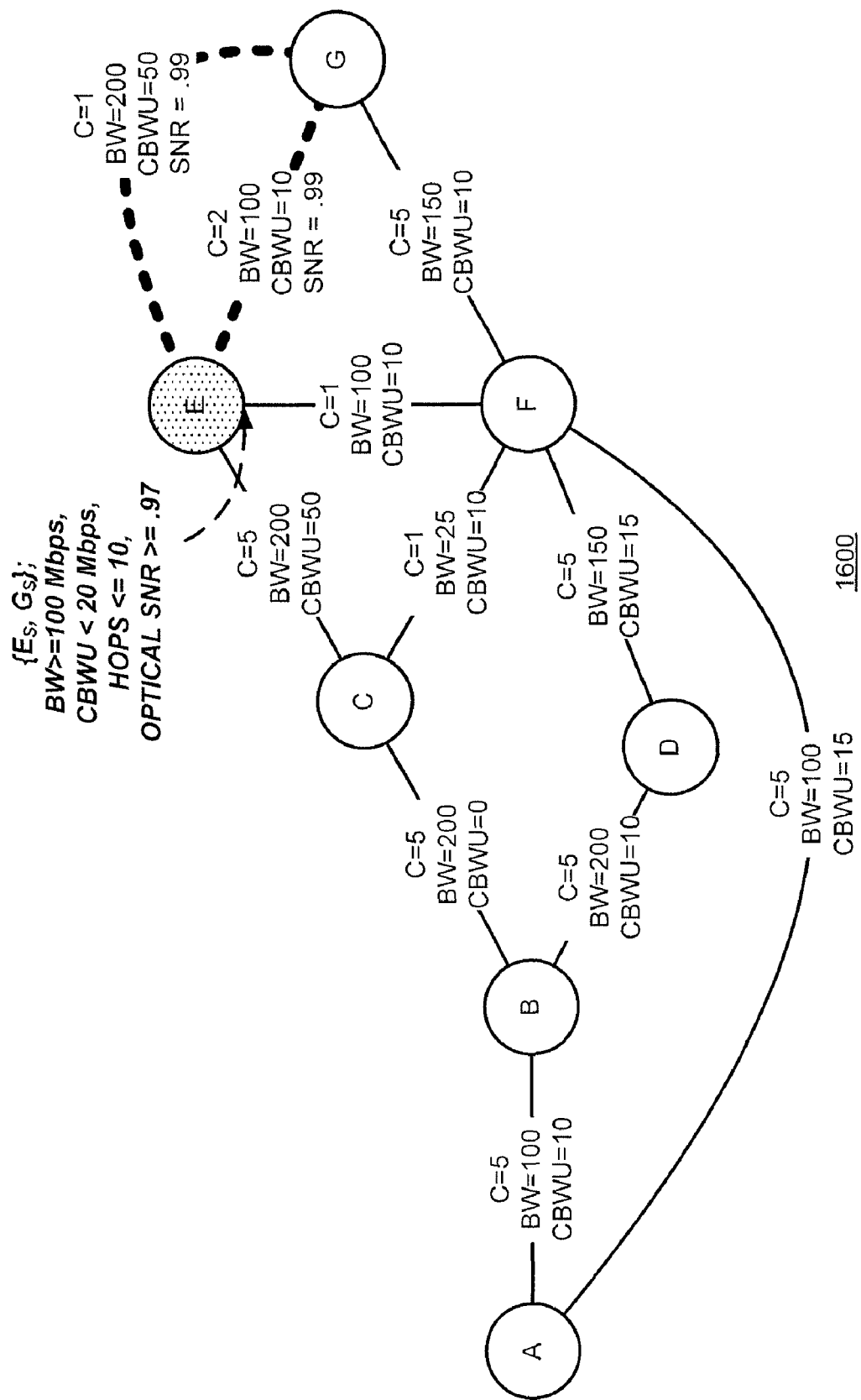

Referring to FIG. 16E, at node E, since node G is the tail-end node, it is treated as a loose hop node. Thus, $link_{E,G,1}$ and $link_{E,G,2}$ may be checked to determine whether either meets the minimum bandwidth constraint of 100 Mbps, the current bandwidth usage constraint of less than 20 Mbps, and the minimum optical signal-to-noise ratio of 0.97. Notice that although $link_{E,G,2}$ has a lower cost, it does not meet the second constraint. Since $link_{E,G,1}$ meets the constraints, and the EXPLICIT_ROUTE object, extended to include the constraint, is forwarded to node G. This message may take the form of: $\{G_s\}$ BW≧100 Mbps, CBWU<20 Mbps, hops≦10, Optical SNR≧0.97.

Since node G is the tail-end node, it can check any end-to-end (e.g., cumulative) path constraints. For example, it can determine that the path A-B-D-F-E-G has no more than 10 hops, it signals that the path is OK back to the head-end node A. This message may be in the form of "RESV" RSVP messages to successive upstream neighbors. (Recall blocks 1301 and 1315 of FIG. 13.) In response to these message, the nodes may generate label bindings. As upstream nodes receive a path OK signal, each may delete an earlier instance of the EXPLICIT_ROUTE object (ERO) it may have stored.

In the foregoing example, simple constraints requiring that the bandwidth be at least 100 MBps, current bandwidth usage of less than 20 Mbps were used, no more than 10 hops and optical signal-to-noise ratio of 0.97 were used. However, as can be appreciated from the following examples, the present invention can signal more complex constraints, and is flexible and extensible enough to support constraints that have not even yet been implemented or considered.

As a first example, the Cisco color semantics and the Juniper color semantics are encoded. Cisco-style color constraints are encoded are two 32-bit strings, an affinity and a mask. A link passes these constraints iff:

(link color & mask) & affinity==affinity.

The following 4-word (instruction) program implements this as follows:

| OpCode | Operand 1 | Operand 2 | Result | Comments |
|---|---|---|---|---|
| 1 | 85 | 255 | 0 | link color & mask 32-bit mask |
| 7 | 0 | 255 | 127 | & affinity 32-bit affinity |

As a second example, Juniper-style color constraints are encoded as two 32-bit strings, an include constraint and an exclude constraint. A link satisfies these constraints iff
((link color & include) !=0) &&
((link color & exclude)==0)

The following 5-word (instruction) program implements this as follows:

| OpCode | Operand 1 | Operand 2 | Result | Comments |
| --- | --- | --- | --- | --- |
| 6 | 85 | 255 | 0 | link color & include 32-bit include |
| 5 | 85 | 255 | 1 | link color & exclude 32-bit exclude |
| 10 | 0 | 1 | 127 | do both pass? |

§4.5 Conclusions

As can be appreciated from the foregoing disclosure, the present invention permits path constraints to be carried, such as while signaling a path. The present invention permits the head-end node of the path to signal its notion of the constraint semantics to the other nodes in the path in an extensible, interoperable fashion. The present invention may doe so by extending RSVP/TE to carry constraint information.

To reiterate, there are several instances in which it is useful to carry a label-switched path's (LSP's) constraints in RSVP/TE—specifically, in the RSVP PATH message used to set up that LSP. However, the head-end node (e.g., label-switching router (LSR)) for the LSP, where the LSP's constraints are configured, may have different notions of constraint semantics from the transit and tail-end nodes (e.g., LSRs). The present invention provides an extensible, interoperable means for the head-end node (e.g., LSR) to communicate its semantics to the other node (e.g., LSRs). The present invention permits constraint semantics to be defined by means of a program. This feature of the present invention may be useful in scenarios such as multi-area or multi-AS constrained routes, delegation of path computation, and admission control.

What is claimed is:

1. A network node comprising:
   a) a plurality of registers including attribute registers, the attribute registers storing attributes of links in a communications network;
   b) a machine-readable storage device having stored thereon at least one network path determination constraint as an executable instruction, each executable instruction including
      i) a first operand pointer,
      ii) a second operand pointer, and
      iii) an operation code,
         wherein at least one of the first and second operand pointers points to one of the attribute registers, and
         wherein the executable instruction was received in a constraint-based path determination message from another network node; and
   c) at least one processor for executing each of the at least one network path determination constraint stored on the machine-readable storage device as an executable instruction.

2. The network node of claim 1 wherein the plurality of registers further includes general purpose registers,
   wherein each of the attribute registers is a read-only register, and
   wherein each of the general purpose registers is read/write register.

3. The network node of claim 1 wherein the machine-readable storage device also has stored thereon at least one network path determination constraint as a list of at least one explicit node that is specified to be a part of the network path.

4. The network node of claim 3 wherein the at least one explicitly specified node is one of a loose-hop node and a strict-hop node.

5. The network node of claim 1 wherein the plurality of registers further include accumulation registers storing cumulative attributes of a path.

6. A router for use in a communications network, the router comprising:
   a) a process for generating a traffic engineering database;
   b) a machine-readable storage device storing a traffic engineering database generated by the processing for generating;
   c) a signaling facility for receiving and transmitting information about the communications network, from and to other nodes in the communications network; and
   d) a constraint-based path determination facility for determining at least a part of a path based on
      i) contents of the traffic engineering database stored on the machine-readable storage device, and
      ii) at least one path constraint received from the signaling facility,
      wherein, responsive to a determination that the router cannot determine a complete constraint-based path to a specified tail-end node, the constraint-based path determination facility performs a constraint-based path determination to a next node selected from a group of nodes consisting of
         an area border node,
         an autonomous system gateway node,
         a node that can process one of the at least one network path determination constraint carried by the message which cannot be evaluated by the present node,
         a specified loose-hop node, and
         a node to which constraint processing is delegated,
   to generate a partial path, and the signaling facility transmits a message carrying the at least one path constraint, as an executable instruction, to an adjacent downstream node on the partial path.

7. The router of claim 6 wherein the path is a label-switched path.

8. A method of establishing a path from a first router to a second router in a communications network, the method comprising:
   a) receiving, by a first intermediary router including at least one processor in a first portion of the path, a message that includes information relating to a set of at least one path constraint as an executable instruction; and
   b) determining, by the first intermediary router, whether a link from the first intermediary router to the next router specified in the first portion of the path satisfies the set of at least one path constraint.

9. The method of claim 8, further comprising:
   c) responsive to a determination that the link from the first intermediary router to the next router specified in the first portion of the path satisfies the set of at least one constraint, transmitting, by the first intermediary router, the received message to the next router.

10. The method of claim 8, further comprising
    c) responsive to a determination that the link from the first intermediary router to the next router specified in the first portion of the path does not satisfy the set of at least one constraint, transmitting, by the first intermediary router, an error message back to the source router.

11. A method of processing a message that includes information defining a first portion of a path from a first node to a second node in a communications network and information relating to a set of at least one constraint for establishing the path, the method comprising:
 a) determining, at a receiving node that receives the message, whether the receiving node comprises the second node or an intermediary node in the path;
 b) responsive to a determination that the receiving node is the second node, generating, at the receiving node, a message to be sent to the first node; and
 c) responsive to a determination that the receiving node is an intermediary node in the path;
  i) determining whether the message specifies at least one of a strict-hop node and a loose-hop node;
  ii) responsive to a determination that the message specifies a strict-hop node, forwarding the message to the strict-hop node on a link in which the set of constraints are met;
  iii) responsive to a determination that the message does not specify a strict-hop node, but specifies a loose-hop node, computing paths from the receiving node to the loose-hop node subject to the set of at least one constraint and selecting one of the computed paths on which to transmit the message; and
  iv) responsive to a determination that the message does not specify either a strict-hop node or a loose-hop node, computing paths from the receiving node to either the second node or an intermediary node subject to the set of at least one constraint and selecting one of the computed paths on which to transmit the message.

12. A computer-readable storage device storing an instruction which is used to determine whether a path through a communications network to a destination node meets a constraint, the instruction comprising:
 a) a first operand specifying a memory location in which a value for an attribute of a router or link of the communications network is stored;
 b) a second operand representing a constraint value for the attribute;
 c) a code specifying an operation to be performed on the first operand and the second operand; and
 d) a result portion specifying a memory location in which a result of the operation performed on the first operand and second operand is stored.

13. A computer-readable storage device storing a message which is used to establish a path through a communications network from a first router to a second router, the message comprising:
 a) a set of at least one constraint for defining the path through the communications network;
 b) a set of at least one instruction for specifying operations to be performed on the set of at least one constraint; and
 c) information relating to at least one previously computed portion of the path through the communications network.

14. The computer-readable storage device according to claim 13, the message further comprising:
 d) information relating to an accumulated value for at least one of the at least one constraint.

* * * * *